US012731369B2

(12) United States Patent
Ahn et al.

(10) Patent No.: US 12,731,369 B2
(45) Date of Patent: Sep. 8, 2026

(54) IMAGE PROCESSING APPARATUS USING CONVOLUTIONAL NEURAL NETWORKS AND OPERATING METHOD THEREOF

(71) Applicant: SAMSUNG ELECTRONICS CO., LTD., Suwon-si (KR)

(72) Inventors: Iljun Ahn, Suwon-si (KR); Soomin Kang, Suwon-si (KR); Jaeyeon Park, Suwon-si (KR); Youngchan Song, Suwon-si (KR); Hanul Shin, Suwon-si (KR); Tammy Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 527 days.

(21) Appl. No.: 18/072,050

(22) Filed: Nov. 30, 2022

(65) Prior Publication Data

US 2023/0169748 A1 Jun. 1, 2023

Related U.S. Application Data

(63) Continuation of application No. PCT/KR2022/018204, filed on Nov. 17, 2022.

(30) Foreign Application Priority Data

Nov. 30, 2021 (KR) ........................ 10-2021-0169338
Aug. 1, 2022 (KR) ........................ 10-2022-0095694

(51) Int. Cl.
*G06V 10/44* (2022.01)
*G06V 10/22* (2022.01)

(52) U.S. Cl.
CPC ............ *G06V 10/454* (2022.01); *G06V 10/22* (2022.01)

(58) Field of Classification Search
CPC ...... G06V 10/454; G06V 10/22; G06V 10/74; G06V 10/82; G06T 2207/20081;
(Continued)

(56) References Cited

U.S. PATENT DOCUMENTS 9,716,830 B2 7/2017 Baek
11,481,574 B2 10/2022 Yang et al.
(Continued)

FOREIGN PATENT DOCUMENTS

CN 105894013 A 8/2016
CN 110309876 A 10/2019
(Continued)

OTHER PUBLICATIONS

Zhang, T., Qi, G., Xiao, B., & Wang, J. (2017). Interleaved Group Convolutions for Deep Neural Networks. ArXiv, abs/1707.02725. (Year: 2017).*

(Continued)

*Primary Examiner* — Vincent Rudolph
(74) *Attorney, Agent, or Firm* — Sughrue Mion, PLLC

(57) ABSTRACT

An image processing apparatus for processing an image by using one or more convolutional neural networks includes a memory storing one or more instructions, and at least one processor configured to execute the one or more instructions stored in the memory to obtain first feature data by performing a convolution operation between input data obtained from a first image and a first kernel, divide a plurality of channels included in the first feature data into first groups, obtain second feature data by performing a convolution operation between the first feature data respectively corresponding to the first groups and second kernels respectively corresponding to the first groups, obtain shuffling data by shuffling the second feature data, obtain output data by performing a convolution operation between data obtained (Continued)

by summing channels included in the shuffling data and a third kernel, and generate a second image based on the output data.

11 Claims, 22 Drawing Sheets

(58) Field of Classification Search
CPC . G06T 2207/20084; G06T 5/60; G06N 3/045; G06N 3/0464; G06N 3/08
See application file for complete search history.

(56) References Cited

U.S. PATENT DOCUMENTS

| | | | | |
|---|---|---|---|---|
| 11,714,921 | B2 | 8/2023 | Fang et al. | |
| 12,230,008 | B2 * | 2/2025 | Park | G06V 10/454 |
| 2019/0147319 | A1 | 5/2019 | Kim et al. | |
| 2020/0364486 | A1 | 11/2020 | Park et al. | |
| 2021/0019633 | A1 | 1/2021 | Venkatesh | |
| 2021/0093310 | A1 | 4/2021 | Baldwin | |
| 2021/0103793 | A1 * | 4/2021 | Huang | G06N 3/08 |
| 2022/0284555 | A1 | 9/2022 | Ahn et al. | |

FOREIGN PATENT DOCUMENTS

| | | | |
|---|---|---|---|
| CN | 112927174 | A | 6/2021 |
| CN | 113052189 | A | 6/2021 |
| JP | 2021-103441 | A | 7/2021 |
| KR | 10-2019-0054770 | A | 5/2019 |
| KR | 10-2020-0132304 | A | 11/2020 |
| KR | 10-2021-0019537 | A | 2/2021 |
| KR | 10-2305470 | B1 | 9/2021 |
| KR | 10-2021-0140757 | A | 11/2021 |

OTHER PUBLICATIONS

R. Gomes, p. Rozario and N. Adhikari, "Deep Learning optimization in remote sensing image segmentation using dilated convolutions and ShuffleNet," 2021 IEEE International Conference on Electro Information Technology (EIT), Mt. Pleasant, MI, USA, 2021, pp. 244-249, doi: 10.1109/EIT51626.2021.9491910. (Year: 2021).*

Q. -L. Zhang and Y. -B. Yang, "SA-Net: Shuffle Attention for Deep Convolutional Neural Networks," ICASSP 2021-2021 IEEE International Conference on Acoustics, Speech and Signal Processing (ICASSP), Toronto, ON, Canada, 2021, pp. 2235-2239, doi: 10.1109/ICASSP39728.2021.9414568. (Year: 2021).*

Su, H., Jampani, V., Sun, D., et al. (2019). Pixel-Adaptive Convolutional Neural Networks. ArXiv, abs/1904.05373. (Year: 2019).*

Wu, J., Li, D., Yang, Y., Bajaj, C., Ji, X. (2019). Dynamic Filtering with Large Sampling Field for ConvNets. Arvix, abs/1803.07624. ( Year: 2019).*

Esquivel, J., Vargas, A., Meyer, P., Tickoo, O. (2019). Adaptive Convolutional Kernels. 2019 IEEE/CVF International Conference on Computer Vision Workshop (ICCVW). doi: 10.1109/ICCVW.2019.00249. (Year: 2019).*

Yanfang Zhang, Weihong Li, Zhenghao Li, Taigong Ning, "Dual attention per-pixel filter network for spatially varying image deblurring," Digital Signal Processing, vol. 113, 2021, 103008, ISSN 1051-2004, https://doi.org/10.1016/j.dsp.2021.103008. (Year: 2021).*

Roy, Swalpa & Manna, Suvojit & Song, Tiecheng & Bruzzone, Lorenzo. (2020). Attention-Based Adaptive Spectral-Spatial Kernel ResNet for Hyperspectral Image Classification. IEEE Transactions on Geoscience and Remote Sensing. 1-13. 10.1109/TGRS.2020.3043267. (Year: 2020).*

Extended European Search Report dated Dec. 18, 2024, issued by the European Patent Office in European Application No. 22901634.0.

Zhang et al., "Interleaved Group Convolutions for Deep Neural Networks", XP080775495, 2017 (11 pages total).

Brabandere et al., "Dynamic Filter Networks", XP093230006, 2016 (14 pages total).

Zhang et al., "Dynet: Dynamic Convolution for Accelerating Convolutional Neural Networks", XP093006338, 2020, pp. 1-16 (16 pages total).

Zamora-Esquivel et al., "Adaptive Convolutional Kernels", XP033732392, 2019, pp. 1998-2005 (8 pages total).

Zhang, Xiangyu et al., "ShuffleNet: An Extremely Efficient Convolutional Neural Network for Mobile Devices", arXiv:1707.01083v1 [cs.CV], pp. 1-10, Jul. 4, 2017.

International Search Report and Written Opinion issued Feb. 27, 2023 by the International Searching Authority in counterpart International Patent Application No. PCT/KR2022/018204. (PCTISA/220, PCT/ISA/210 and PCT/ISA/237).

Howard et al., "MobileNets: Efficient Convolutional Neural Networks for Mobile Vision Applications," arXiv: 1704.04861v1 [cs.CV], Apr. 17, 2017, Total 9 pages.

* cited by examiner

F_out
(W, H, $N_{out}$)

210

Kernel
($N_{in}$,$N_{out}$ ,k x k)

Figure 4:
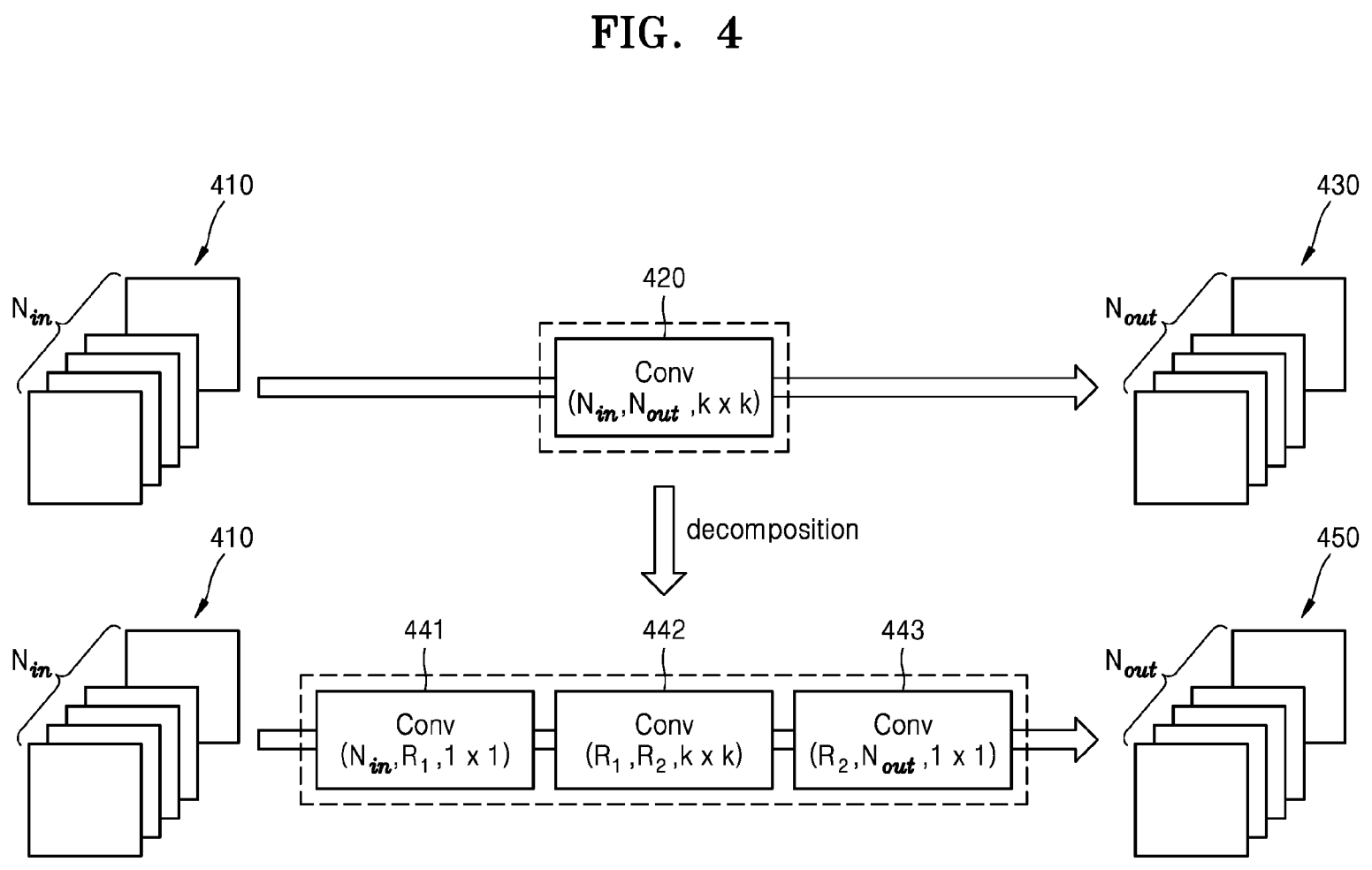

410
$N_{in}$
420
Conv ($N_{in}$, $N_{out}$, k x k)
430
$N_{out}$
decomposition
410
$N_{in}$
441
Conv ($N_{in}$, $R_1$, 1 x 1)
442
Conv ($R_1$, $R_2$, k x k)
443
Conv ($R_2$, $N_{out}$, 1 x 1)
450
$N_{out}$ 540
541
542
549
531
532
539
520
521
522
529
510
$N_{in}$

FIG. 9

101
910
914
101
913 910
101
912 910
101
910
911
K
K
901
FIRST IMAGE
(W, H, 1)
950
SIMILARITY INFORMATION
(W, H, $K^2$)

FIG. 11

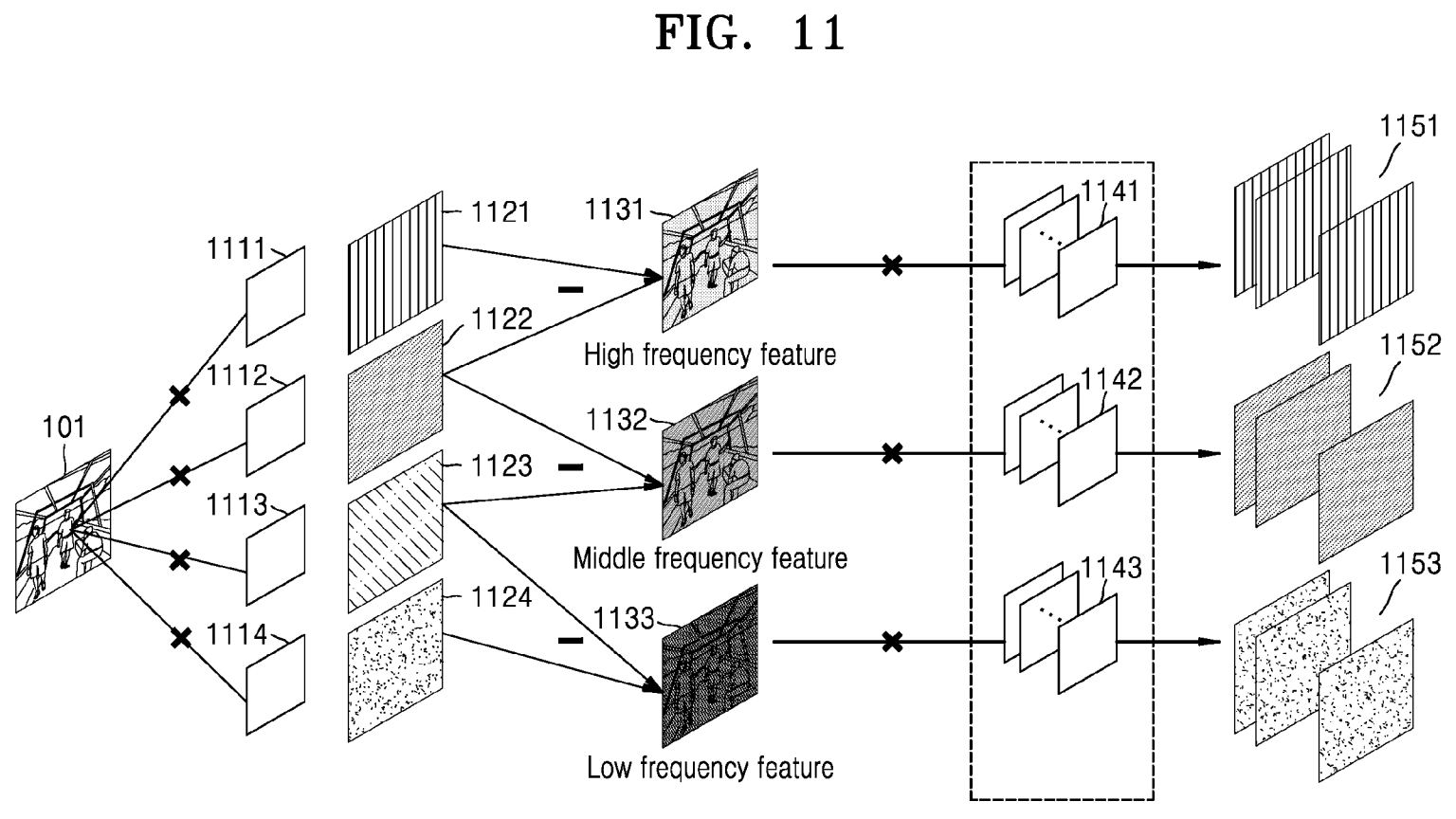

101
1111
1112
1113
1114
1121
1122
1123
1124
1131
High frequency feature
1132
Middle frequency feature
1133
Low frequency feature
1141
1142
1143
1151
1152
1153

1210
1221
1222
1223
1231
1232
1233
1410 1411
1412
1413
1414
1415
1416
1417
1420 1421
1422
1423
1424
1425
1426
1427
1430 1431
1432
1433
1434
1435
1436
1437
1440
1441
1442
1443
1444 1445 1446
1451
1452
1453
1454 1455 1456
1461
1462
1463
1464 1465 1466
1418
1428
1438
1447 1448
1457 1458
1467 1468
1471
1472
1473
1481
1482
1483
1491
1492
1493
1454
1474
1475
1476
1484
1485
1486
1494
1495
1496
1477
1478
1479
1487
1488
1489
1497
1498
1499
1449 1470
1459 1480
1469 1490

IMAGE PROCESSING APPARATUS USING CONVOLUTIONAL NEURAL NETWORKS AND OPERATING METHOD THEREOF

CROSS-REFERENCE TO RELATED APPLICATIONS

This is a bypass application of International Patent Application No. PCT/KR2022/018204 filed on Nov. 17, 2022, which claims priority from Korean Patent Application No. 10-2021-0169338 filed on Nov. 30, 2021 and Korean Patent Application No. 10-2022-0095694, filed on Aug. 1, 2022, in the Korean Intellectual Property Office, the disclosures of which are incorporated by reference herein in their entireties.

TECHNICAL FIELD

Various embodiments of the disclosure relate to an image processing apparatus and operating method for processing an image by using a neural network.

BACKGROUND

As data traffic increases exponentially with the development of computer technology, artificial intelligence has become an important trend that will drive future innovations. Because artificial intelligence is a method of imitating human thinking, it is applicable infinitely to virtually all industries. Representative technologies of artificial intelligence include pattern recognition, machine learning, expert systems, neural networks, natural language processing, etc.

A neural network models the characteristics of human biological nerve cells by using mathematical expressions, and uses an algorithm that mimics the human ability to learn. Through this algorithm, a neural network is able to generate a mapping between input data and output data, and the ability to generate such mapping may be called the learning capability of the neural network. Furthermore, neural networks have a generalization ability to generate, based on training results, correct output data with respect to input data that has not been used for training.

Image processing such as image denoising may be performed by using a deep neural network (e.g., a deep convolutional neural network (CNN)). When image processing is performed by using the CNN, a method of reducing the amount of computation while maintaining the performance of image processing is required.

SUMMARY

An image processing apparatus according to an embodiment of the disclosure may process an image by using one or more convolutional neural networks.

The image processing apparatus according to an embodiment of the disclosure may include a memory storing one or more instructions and at least one processor configured to execute the one or more instructions.

The at least one processor may be further configured to execute the one or more instructions to obtain first feature data based on a first convolution operation being performed between input data obtained from a first image and a first kernel.

The at least one processor may be further configured to execute the one or more instructions to divide a plurality of channels included in the first feature data into first groups.

The at least one processor may be further configured to execute the one or more instructions to obtain second feature data based on a second convolution operation being performed between the first feature data respectively corresponding to the first groups and second kernels respectively corresponding to the first groups.

The at least one processor may be further configured to execute the one or more instructions to obtain shuffling data by shuffling the second feature data.

The at least one processor may be further configured to execute the one or more instructions to obtain output data by performing a convolution operation between data obtained by summing channels included in the shuffling data and a third kernel.

The at least one processor may be further configured to execute the one or more instructions to generate a second image based on the output data.

The number of channels included in the output data may be less than at least one of the number of the plurality of channels included in the first feature data or a number of a plurality of channels included in the second feature data.

The at least one processor may be further configured to execute the one or more instructions to: determine a number of channels included in each of the second kernels based on the number of channels of the first feature data respectively corresponding to the first groups.

The at least one processor may be further configured to execute the one or more instructions stored in the memory to: perform an activation function operation on at least one of the first feature data, the second feature data, or the output data.

The at least one processor may be further configured to execute the one or more instructions stored in the memory to: divide a plurality of channels included in the input data obtained from the first image into second groups, obtain the output data respectively corresponding to the second groups, based on the input data respectively corresponding to the second groups, and obtain the output data corresponding to the input data, by summing channels included in the output data respectively corresponding to the second groups.

The at least one processor may be further configured to execute the one or more instructions stored in the memory to: obtain the input information representing characteristic information of the first image, and the characteristic information of the first image includes similarity information indicating a similarity between each of the pixels included in the first image and a neighboring pixel of each of the pixels.

The at least one processor may be further configured to execute the one or more instructions stored in the memory to: generate an attention map including weight information corresponding to each of a plurality of pixels included in the first image based on the output data, generate a spatially variable kernel corresponding to each of the plurality of pixels, based on a spatial kernel including weight information according to a position relationship between each of the plurality of pixels and a neighboring pixel of each of the plurality of pixels, and the attention map, and generate the second image by applying the spatially variable kernel to the first image.

The at least one processor may be further configured to execute the one or more instructions stored in the memory to: obtain third feature data based on a third convolution operation being performed between the output data and a fourth kernel, divide a plurality of channels included in the third feature data into second groups, obtain fourth feature data based on a fourth convolution operation being performed between the third feature data respectively corresponding to the second groups and fifth kernels respectively corresponding to the second groups, divide a plurality of channels included in the fourth feature data into the first groups and obtain second shuffling data by shuffling the fourth feature data respectively corresponding to the first groups, obtain fifth feature data based on a fifth convolution operation being performed between the second shuffling data and sixth kernels respectively corresponding to the first groups, obtain sixth feature data respectively corresponding to the second groups by summing channels included in the fifth feature data, and generate the attention map based on the sixth feature data.

In the spatial kernel, a pixel located in a center of the spatial kernel may have a greatest value, and a pixel value decreases away from the center.

A size of the spatial kernel may be K×K, and a number of channels of the attention map may be $K^2$.

The at least one processor may be further configured to execute the one or more instructions stored in the memory to: convert pixel values included in the spatial kernel into a weight vector with a size of $1\times1\times K^2$ by arranging the pixel values in a channel direction, and generate the spatially variable kernel based on a multiplication operation being performed between each of one-dimensional vectors with the size of $1\times1\times K^2$ included in the attention map and the weight vector, wherein K denotes a natural number.

The spatially variable kernel may include a same number of kernels as a number of pixels included in the first image.

The at least one processor may be further configured to execute the one or more instructions stored in the memory to: perform filtering by applying a first filter kernel included in the spatially variable kernel to a first region with respect to a first pixel included in the first image, and generate the second image by performing filtering, by applying a second filter kernel included in the spatially variable kernel to a second region with respect to a second pixel included in the first image.

An operating method of an image processing apparatus for processing an image by using one or more convolutional neural networks according to an embodiment of the disclosure may include obtaining first feature data based on a first convolution operation being performed between input data obtained from a first image and a first kernel.

The operating method of the image processing apparatus for processing an image by using one or more convolutional neural networks according to an embodiment of the disclosure may include dividing a plurality of channels included in the first feature data into first groups.

The operating method of the image processing apparatus for processing an image by using one or more convolutional neural networks according to an embodiment of the disclosure may include obtaining second feature data based on a second convolution operation being performed between the first feature data respectively corresponding to the first groups and second kernels respectively corresponding to the first groups.

The operating method of the image processing apparatus for processing an image by using one or more convolutional neural networks according to an embodiment of the disclosure may include obtaining shuffling data by shuffling the second feature data.

The operating method of an image processing apparatus for processing an image by using one or more convolutional neural networks according to an embodiment of the disclosure may include obtaining output data based on a third convolution operation being performed between data obtained by summing channels included in the shuffling data and a third kernel.

The operating method of an image processing apparatus for processing an image by using one or more convolutional neural networks according to an embodiment of the disclosure may include generating a second image based on the output data.

The number of channels included in the output data may be less than at least one of the number of the plurality of channels included in the first feature data or a number of a plurality of channels included in the second feature data.

A non-transitory computer-readable recording medium according to an embodiment of the disclosure may have recorded thereon a program including at least one instruction for performing an operating method of an image processing apparatus for processing an image by using one or more convolutional neural networks according to an embodiment of the disclosure, by a computer.

BRIEF DESCRIPTION OF THE DRAWINGS

FIGS. 2 and 3 are diagrams illustrating a convolution operation performed by a convolution layer.

FIG. 4 is a diagram illustrating a method of configuring one kernel as a plurality of kernels, the one kernel being used for a convolution operation.

FIG. 9 is a reference diagram illustrating a method of generating similarity information according to an embodiment of the disclosure.

FIG. 11 is a diagram illustrating a method of generating frequency characteristic information of a first image according to an embodiment of the disclosure.

DETAILED DESCRIPTION

Figure 1:
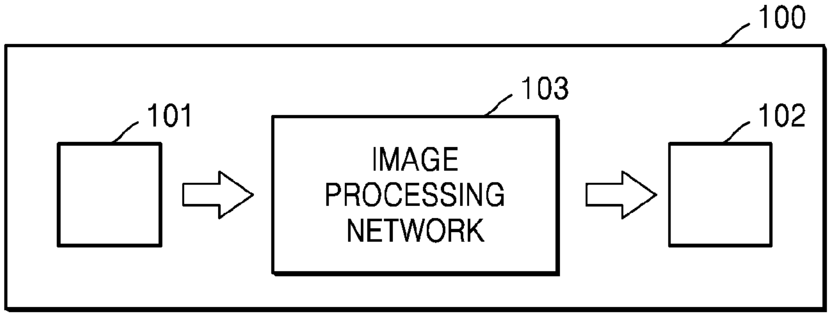
FIG. 1 is a diagram illustrating an operation in which an image processing apparatus processes an image by using an image processing network according to an embodiment of the disclosure.

Throughout the disclosure, the expression "at least one of a, b or c" indicates only a, only b, only c, both a and b, both a and c, both b and c, all of a, b, and c, or variations thereof.

Terms used in the present specification will now be briefly described and then the disclosure will be described in detail.

As the terms used herein, general terms that are currently widely used are selected by taking functions according to the disclosure into account, but the terms may have different meanings according to the intention of one of ordinary skill in the art, precedent cases, or advent of new technologies. Furthermore, specific terms may be arbitrarily selected by the applicant, and In this regard, the meaning of the selected terms will be described in detail in the detailed description of the disclosure. Thus, the terms used herein should be defined not by simple appellations thereof but based on the meaning of the terms together with the overall description of the disclosure.

Throughout the specification, when a part "includes" or "comprises" an element, unless there is a particular description contrary thereto, it is understood that the part may further include other elements, not excluding the other elements. In addition, terms such as "portion", "module", etc., described in the specification refer to a unit for processing at least one function or operation and may be embodied as hardware or software, or a combination of hardware and software.

Embodiments of the disclosure will now be described more fully hereinafter with reference to the accompanying drawings so that they may be easily implemented by one of ordinary skill in the art. However, embodiments of the disclosure may have different forms and should not be construed as being limited to the embodiments set forth herein. In addition, parts not related to descriptions of the disclosure are omitted to clearly explain embodiments of the disclosure in the drawings, and like reference numerals denote like elements throughout.

FIG. 1 is a diagram illustrating an operation in which an image processing apparatus processes an image by using an image processing network according to an embodiment of the disclosure.

Referring to FIG. 1, an image processing network 103 according to an embodiment of the disclosure may receive a first image 101 and process the first image 101 to generate a second image 102. In this regard, the first image 101 may be an image including noise or artifact, and may be a low resolution image or a low quality image. An image processing apparatus 100 may use the image processing network 103 to perform denoising for removing noise while maintaining a fine edge and texture of the first image 101, thereby generating the second image 102 The second image 102 may have a higher resolution than that of the first image 101 and an improved quality compared to the first image 101. However, the disclosure is not limited thereto.

The image processing network 103 according to an embodiment of the disclosure may include one or more convolutional neural networks. A convolutional neural network may include one or more convolution layers. At each of the convolution layers, a convolution operation between an input image (or input data, input information, etc.) input to the convolution layer and a kernel may be performed.

Figure 2:
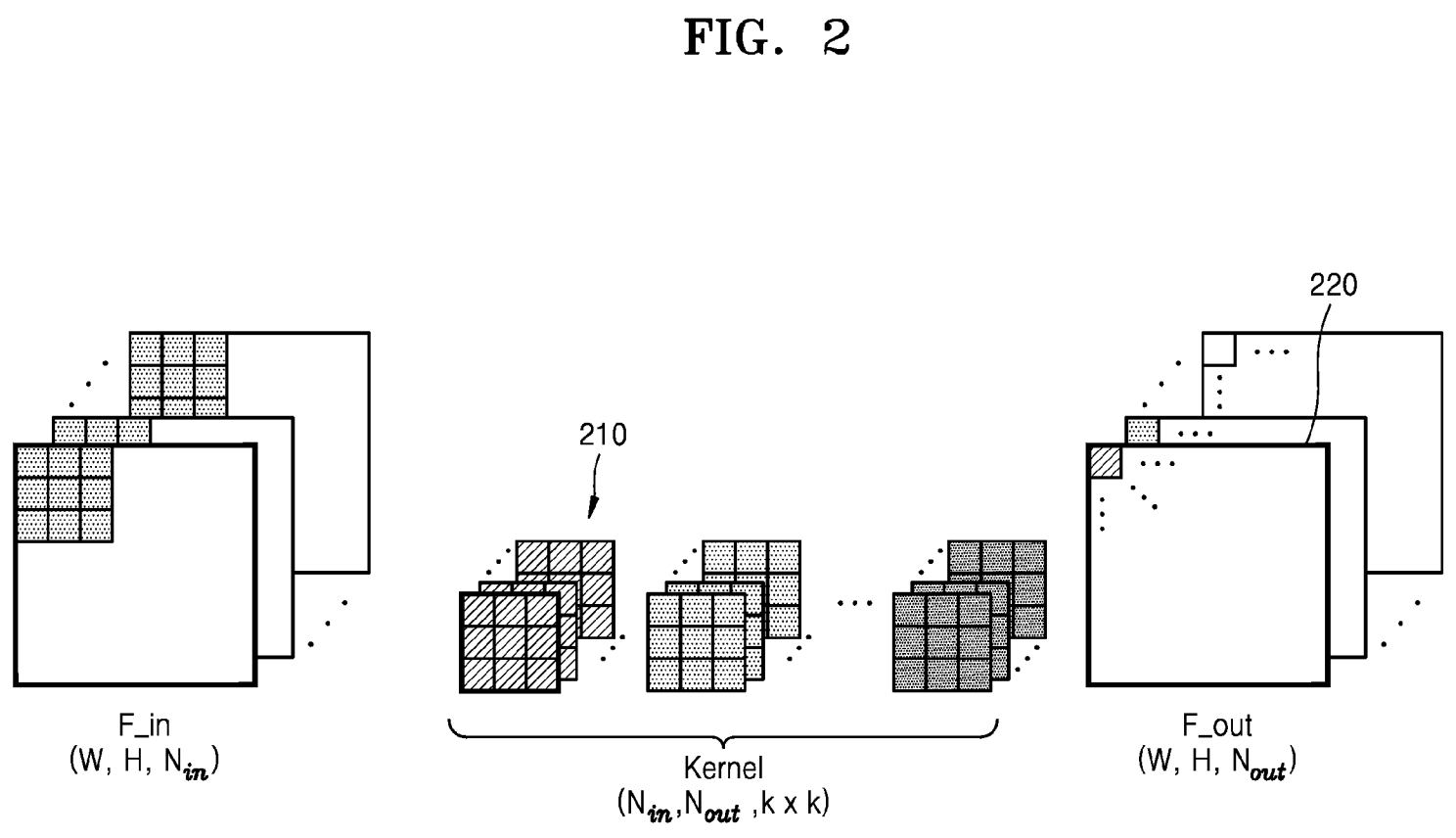
Figure 3:
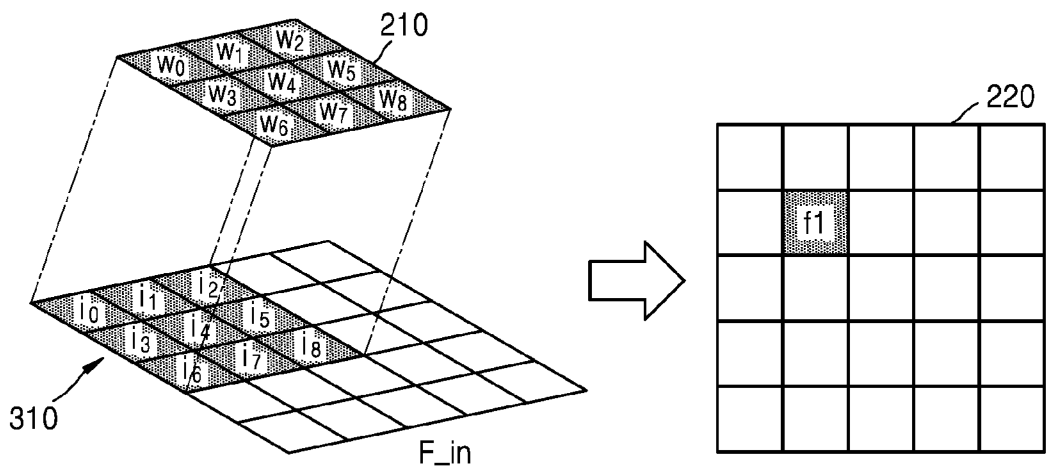

FIGS. 2 and 3 are diagrams illustrating a convolution operation performed by a convolution layer.

FIG. 2 illustrates an input image (or an input feature map) F_in input to a convolution layer, a kernel included in the convolution layer, and an output image (or an output feature map) F_out output from the convolution layer.

Referring to FIG. 2, the size of the input image F_in input to the convolution layer may be W×H, and the number of channels may be Nin. Also, the convolution layer may include a kernel, and the kernel may include Nout sub-kernels. In addition, one sub-kernel may have the size of k×k×Nin. The number Nin of channels of one sub-kernel may be the same as the number Nin of channels of the input image F_in. The convolution layer may generate the output image F_out, by performing the convolution operation between the input image F_in and the kernel. In this regard, the size of the output image F_out may be W×H, and the number of channels of the output image F_out may be determined by the number Nout of sub-kernels of the kernel. For example, a first channel image of the output image F_out may be generated by performing a convolution operation between the input image F_in and a first sub-kernel, and a second channel image of the output image F_out may be generated by performing a convolution operation between the input image F_in and a second sub-kernel. Also, an Nout-th channel image of the output image F_out may be generated by performing a convolution operation between the input image F_in and an Nout-th sub-kernel.

FIG. 3 is a reference diagram illustrating a process of generating a first channel image 220 of the output image F_out, through the convolution operation between the input image F_in and a first sub-kernel 210 included in the kernel according to an embodiment of the disclosure.

In FIG. 3, for convenience of descriptions, it is assumed that the size of the input image F_in is 5×5 and the number Nin of channels is 1. Also, it is assumed that the size of one sub-kernel included in the kernel applied to the input image F_in is 3×3 and the number Nin of channels is 1.

FIG. 3 illustrates the process of extracting a feature of the input image F_in, by applying the first sub-kernel 210 from an upper left to a lower right of the input image F_in. In this regard, the size of the first sub-kernel 210 is 3×3, and the number of channels is 1. For example, the convolution operation may be performed in the convolution layer by applying the first sub-kernel 210 to pixels included in a 3×3 region 310 of the upper left of the input image F_in.

That is, one pixel value f1 mapped to the 3×3 region 310 of the upper left may be calculated, by respectively multiplying pixel values of pixels $i_0$, $i_1$, $i_2$, $i_3$, $i_4$, $i_5$, $i_6$, $i_7$, and is included in the 3×3 region 310 of the upper left by weights $w_0$, $w_1$, $w_2$, $w_3$, $w_4$, $w_5$, $w_6$, $w_7$, and $w_8$ included in the first sub-kernel 210 and summing the multiplied pixel values and weights.

In this regard, the pixel value f1 may be expressed by Equation 1 below.

$$f1 = w_0i_0 + w_1i_1 + w_2i_2 + w_3i_3 + w_4i_4 + w_5i_5 + w_6i_6 + w_7i_7 + w_8i_8 \quad \text{[Equation 1]}$$

In the same manner, pixel values included in the first channel image 220 of the output image F_out may be generated, by multiplying the parameter values included in the first sub-kernel 210 by the pixel values of the input image F_in and summing multiplied values, while sliding the first sub-kernel 210 from the left to the right and from the top to the bottom by one pixel within the input image F_in. In this regard, target data of the convolution operation may be sampled while shifting by one pixel, but may be sampled while shifting by two or more pixels. A size of a shift performed between pixels sampled during a sampling process is referred to as a stride, and the size of the output image F_out may be determined according to the size of the stride. Also, as shown in FIG. 2, padding may be performed to make the size of output image F_out the same as that of the input image F_in. Padding means increasing the size of the input image F_in, by giving a specific value (e.g., '0') to the edge of the input image F_in, in order to prevent the size of the output image F_out that is output from being reduced. When the convolution operation is performed after padding is performed, the size of the output image F_out may be the same as the size of the input image F_in. However, the disclosure is not limited thereto.

Meanwhile, although FIG. 3 illustrates only the result (the first channel image 220 of the output image F_out) of the convolution operation on the first sub-kernel 210, when the convolution operation is performed on Nout sub-kernels, the output image F_out including D channel images may be output. That is, the number of channels of the output image F_out may be determined according to the number of sub-kernels included in the kernel.

FIG. 4 is a diagram illustrating a method of configuring one kernel as a plurality of kernels, the one kernel being used for a convolution operation.

Referring to FIG. 4, the image processing apparatus 100 according to an embodiment of the disclosure may obtain first output data 430, by performing a convolution operation between input data 410 and a first kernel 420.

In this regard, the input data 410 may include Nin channels, and the first output data 430 may include Nout channels. Also, the first kernel 420 has Nout sub-kernels, one sub-kernel may include Nin channels, and the size of one channel may be $k^2$.

The first kernel 420 according to an embodiment of the disclosure may be decomposed into a plurality of kernels. For example, the first kernel 420 may be decomposed into a second kernel 441, a third kernel 442, and a fourth kernel 443. In this regard, the second kernel 441 may include R1 sub-kernels, one sub-kernel may include Nin channels, and the size of one channel may be 1. Also, the third kernel 442 may include R2 sub-kernels, one sub-kernel may include R1 channels, and the size of one channel may be $k^2$. Also, the fourth kernel 443 may include Nout sub-kernels, one sub-kernel may include R2 channels, and the size of one channel may be 1. However, the disclosure is not limited thereto.

The image processing apparatus 100 according to an embodiment of the disclosure may obtain first middle data, by performing a convolution operation between the input data 410 and the second kernel 441. The image processing apparatus 100 may obtain second middle data, by performing a convolution operation between the first middle data and the third kernel 442. Also, the image processing apparatus 100 may obtain second output data 450, by performing a convolution operation between the second middle data and the fourth kernel 443. The first output data 430 and the second output data 450 according to an embodiment of the disclosure may be similar data having a small error range.

When the image processing apparatus 100 obtains the first output data 430 by performing a convolution operation between the input data 410 and the first kernel 420, the number of parameters used in the operation is $N_{in} \times N_{out} \times k^2$. When the image processing apparatus 100 obtains the second output data 450 by performing a convolution operation using the input data 410 and the second kernel 441, the third kernel 442, and the fourth kernel 443, the number of parameters used in the operation is $N_{in} \times R_1 + R_1 \times R_2 \times k^2 + R_2 \times N_{out}$. At this time, R1 and R2 are respectively set to numbers smaller than Nin and Nout. Accordingly, the memory usage and the operation amount may be significantly reduced when obtaining the second output data 450 by performing a convolution operation using the input data 410, the second kernel 441, the third kernel 442, and the fourth kernel 443 compared to when obtaining the first output data 430 by performing a convolution operation between the input data 410 and the first kernel 420.

When the number of channels of input data and the number of channels of output data are large (the number of sub-kernels included in a kernel and the number of channels included in one sub-kernel are large), the image processing apparatus 100 according to an embodiment of the disclosure may perform a convolution operation by decomposing one kernel into a plurality of kernels. Accordingly, the image processing apparatus 100 may significantly reduce the memory usage and the operation amount while maintaining the performance of image processing.

Figure 5:
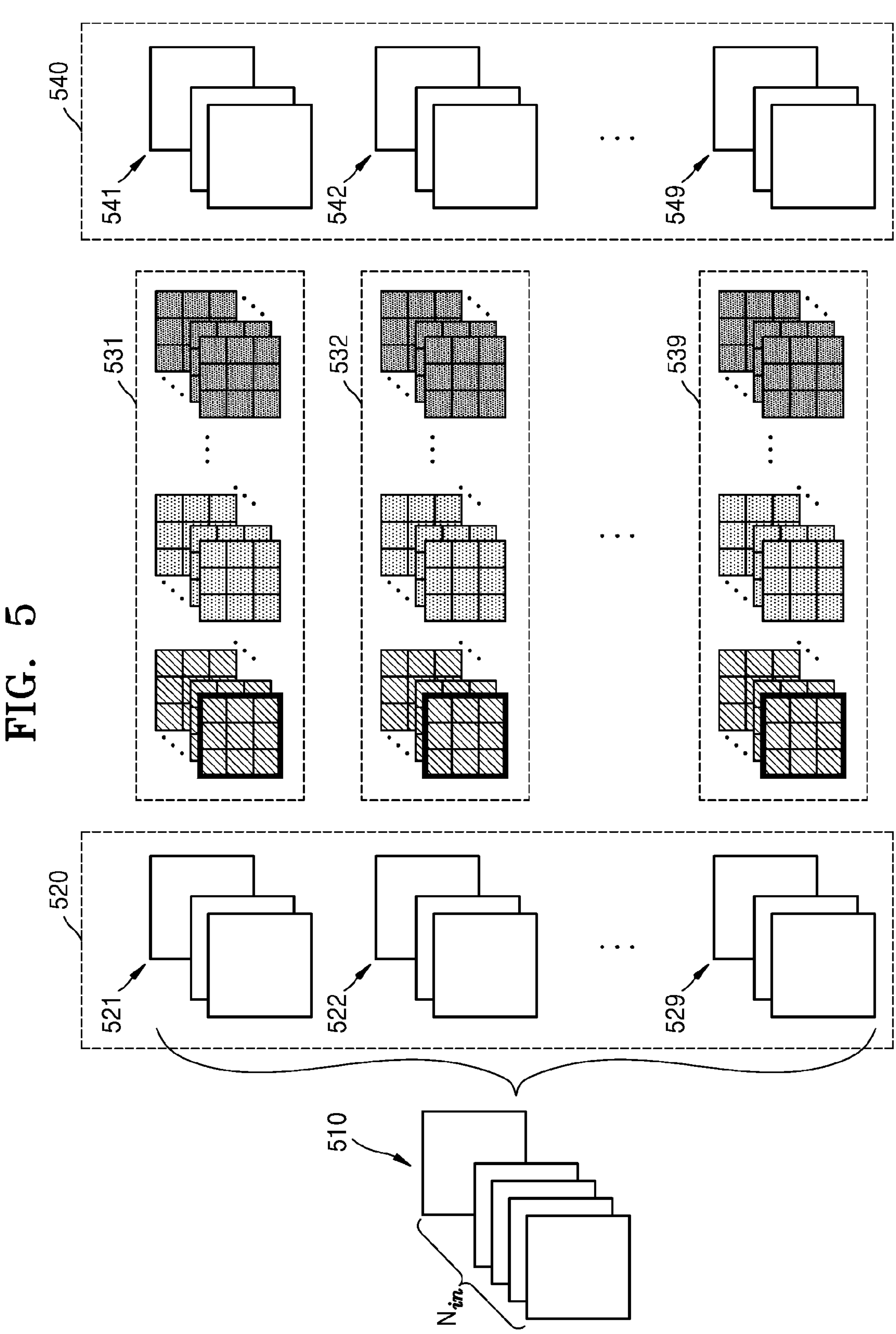
FIG. 5 is a diagram illustrating a method, performed by an image processing apparatus, of performing group convolution according to an embodiment of the disclosure.

FIG. 5 is a diagram illustrating a method, performed by an image processing apparatus, of performing group convolution according to an embodiment of the disclosure.

Referring to FIG. 5, when input data 510 includes a plurality of channels, the image processing apparatus 100 according to an embodiment of the disclosure may divide the channels into a plurality of groups and perform a convolution operation.

For example, as shown in FIG. 5, when the input data 510 includes Nin channels, the image processing apparatus 100 may divide the channels into first to n-th groups 520. The first group may have $a_1$ channels, the second group may have $a_2$ channels, and the n-th group may have an channels, and the total number of channels included in the first to n-th groups is Nin.

The image processing apparatus 100 according to an embodiment of the disclosure may perform a convolution operation on each of the first to n-th groups 520. The image processing apparatus 100 may obtain output data 541 corresponding to the first group, by performing a convolution operation between input data 521 of the first group and a first kernel 531. In this regard, the number of channels of the output data 541 corresponding to the first group may be $b_1$.

Also, the image processing apparatus 100 may obtain output data 542 corresponding to the second group, by performing a convolution operation between input data 522 of the second group and a second kernel 532. In this regard, the number of channels of the output data 542 corresponding to the second group may be $b_2$. Also, the image processing apparatus 100 may obtain output data 549 corresponding to the n-th group, by performing a convolution operation between input data 529 of the n-th group and an n-th kernel 539. In this regard, the number of channels of the output data 549 corresponding to the n-th group may be $b_n$. The total sum of the number of channels of the output data 540 corresponding to the first to n-th groups is Nout.

In this regard, the first kernel 531 may include $b_1$ sub-kernels, and one sub-kernel may include $a_1$ channels. Also, the second kernel 532 may include $b_2$ sub-kernels, and one sub-kernel may include $a_2$ channels. Also, the n-th kernel 539 may include $b_n$ sub-kernels, and one sub-kernel may include an channels. The size of one channel included in the first to n-th kernels may be $k^2$.

Accordingly, when the image processing apparatus 100 obtains output data by performing a group convolution operation, the number of parameters used in the operation is $k^2(a_1 \times b_1 + a_2 \times b_2 + \ldots + a_n \times b_n)$. Meanwhile, as described with reference to FIG. 4, when the image processing apparatus 100 obtains the output without performing the group convolution operation, the number of parameters used in the operation is $N_{in} \times N_{out} \times k^2$. At this time, because $a_1+a_2+\ldots+a_n=N_{in}$ and $b_1+b_2+\ldots+b_n=N_{out}$, the memory usage and the operation amount may be significantly reduced when the image processing apparatus 100 performs the group convolution operation compared to when the image processing apparatus 100 does not perform the group convolution operation.

When the number of channels of input data and the number of channels of output data are large (the number of sub-kernels included in a kernel and the number of channels included in one sub-kernel are large), the image processing apparatus 100 according to an embodiment of the disclosure may perform the group convolution operation, thereby significantly reducing the memory usage and the operation amount.

Figure 6:
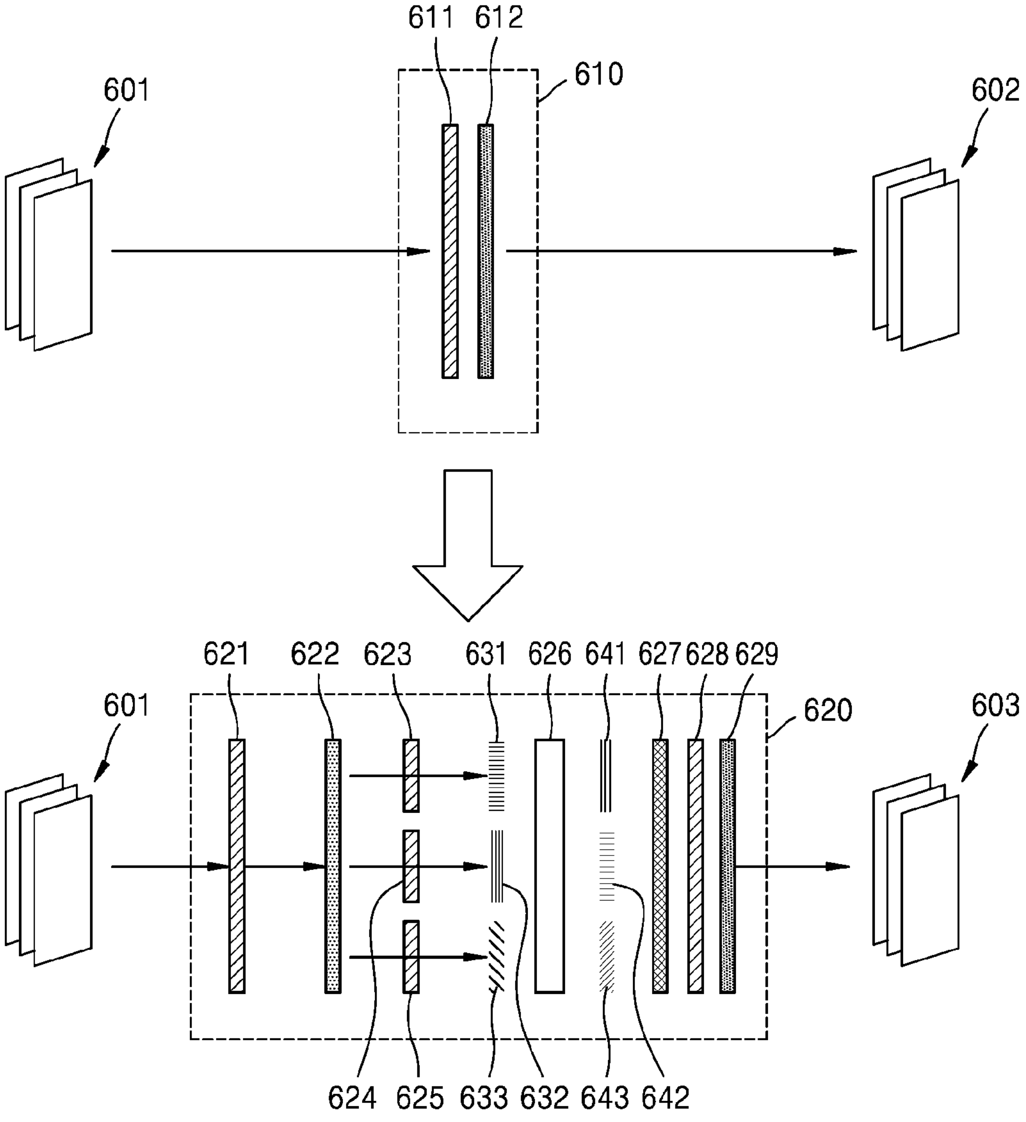
FIG. 6 is a diagram illustrating an operation in which an image processing apparatus obtains output data by performing a convolution operation on input data according to an embodiment of the disclosure.

FIG. 6 is a diagram illustrating an operation in which an image processing apparatus obtains output data by performing a convolution operation on input data according to an embodiment of the disclosure.

Referring to FIG. 6, the image processing apparatus 100 according to an embodiment of the disclosure may obtain first output data 602, by processing input data 601 through a first convolutional neural network 610 including one convolution layer 611 and an activation layer 612.

The image processing apparatus 100 according to an embodiment of the disclosure may obtain second output data 603, by processing the input data 601 through a second convolutional neural network 620.

The first convolutional neural network 610 and the second convolutional neural network 620 according to an embodiment of the disclosure may perform image processing for the same purpose. Accordingly, the first output data 602 and the second output data 603 according to an embodiment of the disclosure may be similar data having a small error range.

The second convolutional neural network 620 according to an embodiment of the disclosure may be a neural network obtained by reducing the memory usage and the operation amount of the first convolutional neural network 610. The second convolutional neural network 620 according to an embodiment of the disclosure may include a plurality of kernels obtained by decomposing a kernel included in the convolution layer 611 of the first convolutional neural network 610, and may be configured to divide middle output data into a plurality of groups and process the data.

Accordingly, the operation amount and the memory used for an operation performed by the second convolutional neural network 620 according to an embodiment of the disclosure may be smaller than the operation amount and the memory used for an operation performed by the first convolutional neural network 610.

The second convolutional neural network 620 according to an embodiment of the disclosure may include one or more convolution layers, one or more activation layers, one or more split layers, and one or more concatenation layers.

Referring to FIG. 6, the input data 601 may be input to a first convolution layer 621. The first convolution layer 621 may obtain first feature data, by performing a convolution operation between the input data 601 and a first kernel. At this time, the first feature data may include a plurality of channels.

The first feature data may be input to a split layer 622. The split layer 622 may divide the plurality of channels included in the first feature data into first groups. For example, the split layer 622 may divide the plurality of channels included in the first feature data into ⅓ so that each of the three groups may be output to a convolution layer. For example, the image processing apparatus 100 may output first feature data of a 1-1th group to a second convolution layer 623, output first feature data of a 1-2th group to a third convolution layer 624, and output first feature data of a 1-3th group to a fourth convolution layer 625. However, the disclosure is not limited thereto, and the split layer 622 may divide the plurality of channels included in the first feature data into n groups, so that the groups may be respectively output to n convolution layers.

The image processing apparatus 100 may obtain first middle data 631, by performing a convolution operation between the first feature data of the 1-1th group input to the second convolution layer 623 and the second kernel included in the second convolution layer 623. In addition, the image processing apparatus 100 may obtain second middle data 632, by performing a convolution operation between the first feature data of the 1-2th group input to the third convolution layer 624 and the third kernel included in the third convolution layer 624. In addition, the image processing apparatus 100 may obtain third middle data 633, by performing a convolution operation between the first feature data of the 1-3th group input to the fourth convolution layer 625 and the fourth kernel included in the fourth convolution layer 625.

The image processing apparatus 100 according to an embodiment of the disclosure may obtain first to third shuffling data 641, 642, and 643, by shuffling the first to third middle data 631, 632, and 633 via a shuffling neural network 626 which includes at least one layer. For example, each of the first to third shuffling data 641, 642, and 643 may include some channels included in at least two of the first, second, or third middle data 631, 632, or 633.

Specifically, the first shuffling data 641 may be obtained by shuffling the first to third middle data 631, 632, and 633 to include an i-th channel of the first middle data 631, an i-th channel of the second middle data 632, and an i-th channel of the third middle data 633. The second shuffling data 642 may be obtained by shuffling the first to third middle data 631, 632, and 633 to include a j-th channel of the first middle data 631, a j-th channel of the second middle data 632, and a j-th channel of the third middle data 633. The third shuffling data 643 may be obtained by shuffling the first to third middle data 631, 632, and 633 to include a k-th channel of the first middle data 631, a k-th channel of the second middle data 632, and a k-th channel of the third middle data 633. However, the disclosure is not limited thereto, and shuffling may be performed in various ways.

The image processing apparatus 100 according to an embodiment of the disclosure may share information included in the first to third middle data 631, 632, and 633 by performing shuffling, thereby improving the performance of image processing.

The first to third shuffling data 641, 642, and 643 may be input to a concatenation layer 627, and the concatenation layer 627 may output concatenation data obtained by concatenating the first to third shuffling data 641, 642, and 643 in a channel direction to a fifth convolution layer 628.

The fifth convolution layer 628 may obtain second feature data, by performing a convolution operation between the concatenation data and a fifth kernel included in the fifth convolution layer 628.

The second feature data may be input to an activation layer 629. The activation layer 629 may obtain second output data 603 by applying an activation function to the second feature data input to the activation layer 629.

Figure 7:
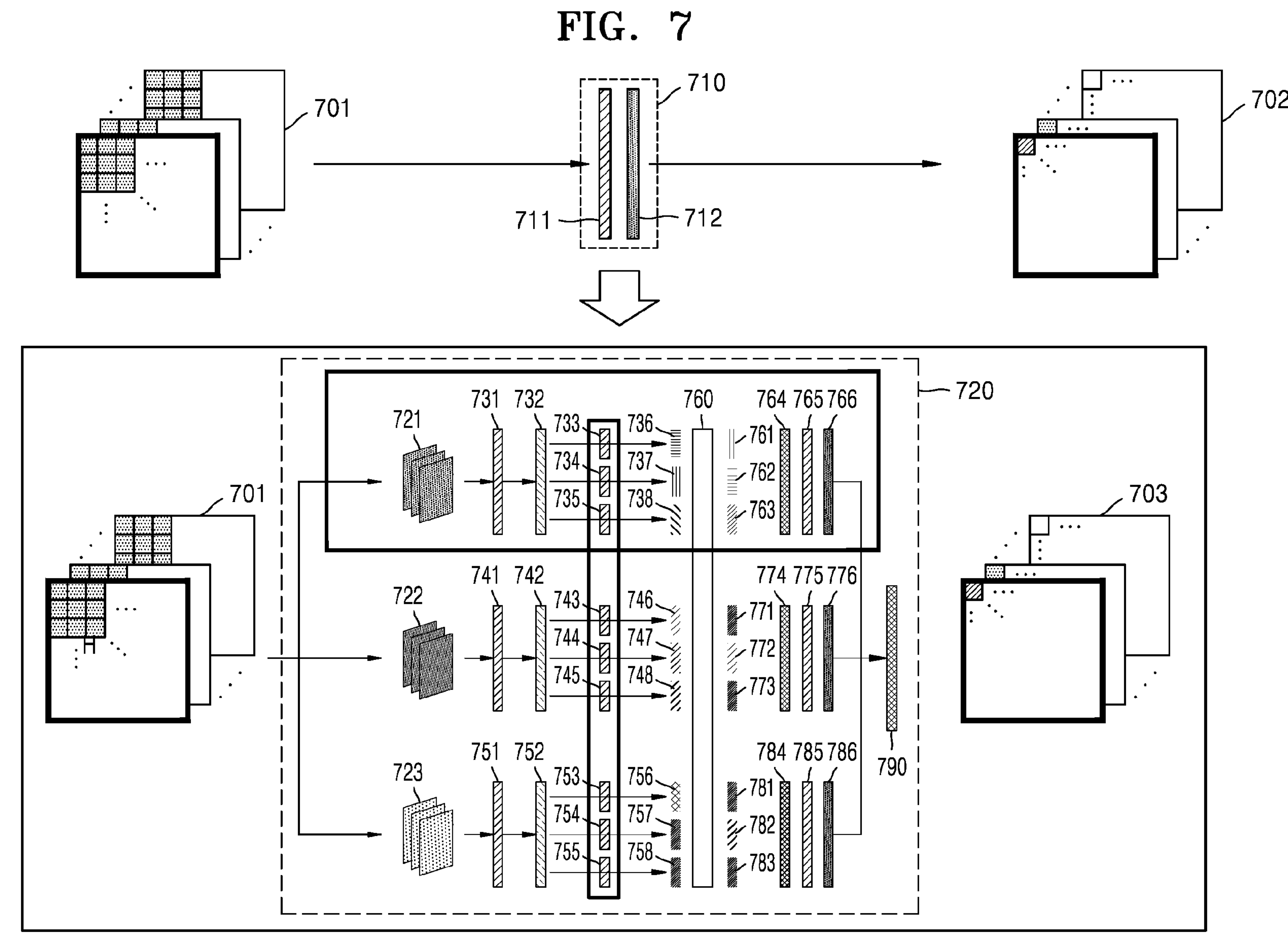
FIG. 7 is a diagram illustrating an operation in which an image processing apparatus obtains output information by performing a convolution operation on input information according to an embodiment of the disclosure.

FIG. 7 is a diagram illustrating an operation in which an image processing apparatus obtains output information by performing a convolution operation on input information according to an embodiment of the disclosure.

Referring to FIG. 7, the image processing apparatus 100 according to an embodiment of the disclosure may obtain first output information 702, by processing input information 701 through a first convolutional neural network 710 including one convolution layer 711 and an activation layer 712.

The image processing apparatus 100 according to an embodiment of the disclosure may obtain second output information 703, by processing the input information 701 through a second convolutional neural network 720.

The first convolutional neural network 710 and the second convolutional neural network 720 according to an embodiment of the disclosure may perform image processing for the same purpose. Accordingly, the first output information 702 and the second output information 703 according to an embodiment of the disclosure may be similar data having a small error range.

The second convolutional neural network 720 according to an embodiment of the disclosure may be a neural network obtained by reducing the memory usage and the operation amount of the first convolutional neural network 710. The second convolutional neural network 720 according to an embodiment of the disclosure may include a plurality of kernels obtained by decomposing a kernel included in the convolution layer 711 of the first convolutional neural network 710, and may be configured to divide input information or input data into a plurality of groups and process data.

Accordingly, the operation amount and the memory used for an operation performed by the second convolutional neural network 720 according to an embodiment of the disclosure may be smaller than the operation amount and the memory used for an operation performed by the first convolutional neural network 710.

The second convolutional neural network 720 according to an embodiment of the disclosure may include one or more convolution layers, one or more activation layers, one or more split layers, and one or more concatenation layers.

Referring to FIG. 7, the image processing apparatus 100 according to an embodiment of the disclosure may divide a plurality of channels included in the input information 701 into first groups. For example, each of three groups in which the plurality of channels included in the input information 701 are divided into ⅓ may be input to a convolution layer. For example, input information 721 of a 1-1th group may be input to a first convolution layer 731, input information 722 of a 1-2th group may be input to a second convolution layer 741, and input information 723 of a 1-3th group may be input to a third convolution layer 751. However, the disclosure is not limited thereto, and the plurality of channels included in the input information 701 may be divided into n groups, and the n groups may be respectively input to n convolution layers.

The image processing apparatus 100 may obtain 1-1th feature data, by performing a convolution operation between the input information 721 of the 1-1th group input to the first convolution layer 731 and a first kernel included in the first convolution layer 731. In addition, the image processing apparatus 100 may obtain 1-2th feature data, by performing a convolution operation between the input information 722 of the 1-2th group input to the second convolution layer 741 and a second kernel included in the second convolution layer 741. In addition, the image processing apparatus 100 may obtain 1-3th feature data, by performing a convolution operation between the input information 723 of the 1-3th group input to the third convolution layer 751 and a third kernel included in the third convolution layer 751.

The 1-1th feature data may be input to a first split layer 732. The first split layer 732 may divide a plurality of channels included in the 1-1th feature data into second groups. For example, the plurality of channels included in the 1-1th feature data may be divided into ⅓, and each of the three groups may be input to the convolution layer. For example, 1-1th feature data of a 2-1th group may be input to a fourth convolution layer 733, 1-1th feature data of a 2-2th group may be input to a fifth convolution layer 734, and 1-1th feature data of a 2-3th group may be input to a sixth convolution layer 735. However, the disclosure is not limited thereto, and the plurality of channels included in the 1-1th feature data may be divided into n groups, and the n groups may be respectively input to the n convolution layers.

The image processing apparatus 100 may obtain first middle data 736, by performing a convolution operation between the 1-1th feature data of the 2-1th group input to the fourth convolution layer 733 and a fourth kernel included in the fourth convolution layer 733. In addition, the image processing apparatus 100 may obtain second middle data 737, by performing a convolution operation between the 1-1th feature data of the 2-2th group input to the fifth convolution layer 734 and a fifth kernel included in the fifth convolution layer 734. In addition, the image processing apparatus 100 may obtain third middle data 738, by performing a convolution operation between the 1-1th feature data of the 2-3th group input to the sixth convolution layer 735 and a sixth kernel included in the sixth convolution layer 735.

In addition, the 1-2th feature data may be input to a second split layer 742, and the second split layer 742 may divide a plurality of channels included in the 1-2 the feature data into second groups. For example, the plurality of channels included in the 1-2 the feature data may be divided into ⅓, and each of three groups (a 2-4th group, a 2-5th group, and a 2-6th group) may be input to the convolution layer.

Accordingly, the image processing apparatus 100 may also obtain fourth to sixth middle data 746, 747, and 748 with respect to the 1-2th feature data, by using seventh to ninth convolution layers 743, 744, and 745 in the same manner as for the 1-1th feature data. A method of performing convolution operations on the 1-2th feature data is the same as the method of performing convolution operations on the 1-1th feature data, and thus a detailed description thereof is omitted.

In addition, the 1-3th feature data may be input to a third split layer 752, and the third split layer 752 may divide a plurality of channels included in the 1-3th feature data into second groups. For example, the plurality of channels included in the 1-3th feature data may be divided into ⅓, and each of three groups (a 2-7th group, a 2-8th group, and a 2-9th group) may be input to the convolution layer.

Accordingly, the image processing apparatus 100 may also obtain seventh to ninth middle data 756, 757, and 758 with respect to the 1-3th feature data, by using tenth to twelfth convolution layers 753, 754, and 755 in the same manner as for the 1-1th feature data. A method of performing convolution operations on the 1-3th feature data is the same as the method of performing convolution operations on the 1-1th feature data, and thus a detailed description thereof is omitted.

The image processing apparatus 100 according to an embodiment of the disclosure may obtain first to ninth shuffling data 761, 762, 763, 771, 772, 773, 781, 782, and 783, by shuffling the first to ninth middle data 736, 737, 738, 746, 747, 748, 756, 757, and 758 in a shuffling layer 760. For example, each of the first to ninth shuffling data 761, 762, 763, 771, 772, 773, 781, 782, and 783 may include some channels included in at least two of the first to eighth, or ninth middle data 736, 737, 738, 746, 747, 748, 756, 757, or 758.

Specifically, the first shuffling data 761 may be obtained by shuffling the first middle data 736, the second middle data 737, and the third middle data 738 to include an i-th channel of the first middle data 736, an i-th channel of the second middle data 737, and an i-th channel of the third middle data 738. The second shuffling data 762 may be obtained by shuffling the first middle data 736, the second middle data 737, and the third middle data 738 to include a j-th channel of the first middle data 736, a j-th channel of the second middle data 737, and a j-th channel of the third middle data 738. The third shuffling data 763 may be obtained by shuffling the first middle data 736, the second middle data 737, and the third middle data 738 to include a k-th channel of the first middle data 763, a k-th channel of the second middle data 737, and a k-th channel of the third middle data 739. However, the disclosure is not limited thereto, and shuffling may be performed in various ways.

The image processing apparatus 100 according to an embodiment of the disclosure may share information included in the first to ninth middle data 736, 737, 738, 746, 747, 748, 756, 757, and 758, by performing shuffling, thereby improving the performance of image processing.

The first to third shuffling data 761, 762, and 763 may be input to a first concatenation layer 764, and in the first concatenation layer 764, the image processing apparatus 100 may output first concatenation data obtained by concatenating first to third shuffling data 761, 762, and 763 in a channel direction to a thirteenth convolution layer 765.

In the thirteenth convolution layer 765, the image processing apparatus 100 may obtain second feature data, by performing a convolution operation between the first concatenation data and a thirteenth kernel included in the thirteenth convolution layer 765.

The second feature data may be input to an activation layer 766. In the activation layer 766, the image processing apparatus 100 may obtain first output data, by applying an activation function to the second feature data input to the activation layer 766.

In addition, the fourth to sixth shuffling data 771, 772, and 773 may be input to a second concatenation layer 774, and in the second concatenation layer 774, the image processing apparatus 100 may output second concatenation data obtained by concatenating the fourth to sixth shuffling data 771, 772, and 773 in a channel direction to the fourteenth convolution layer 775.

In the fourteenth convolution layer 775, the image processing apparatus 100 may obtain third feature data, by performing a convolution operation between the second concatenation data and a fourteenth kernel included in the fourteenth convolution layer 775.

The third feature data may be input to an activation layer 776. In the activation layer 776, the image processing apparatus 100 may obtain second output data by applying an activation function to the third feature data input to the activation layer 776.

In addition, the seventh to ninth shuffling data 781, 782, and 783 may be input to a third concatenation layer 784, and, in the third concatenation layer 784, the image processing apparatus 100 may output third concatenation data obtained by concatenating the seventh to ninth shuffling data 781, 782, and 783 in the channel direction to the fifteenth convolution layer 785.

In the fifteenth convolution layer 785, the image processing apparatus 100 may obtain fourth feature data, by performing a convolution operation between the third concatenation data and a fifteenth kernel included in the fifteenth convolution layer 785.

The fourth feature data may be input to an activation layer 786. In the activation layer 786, the image processing apparatus 100 may obtain third output data by applying an activation function to the fourth feature data input to the activation layer 786.

The first to third output data may be input to a fourth concatenation layer 790. In the fourth concatenation layer 790, the image processing apparatus 100 may obtain the second output information 703 by concatenating the first to third output data in the channel direction.

Figure 8:
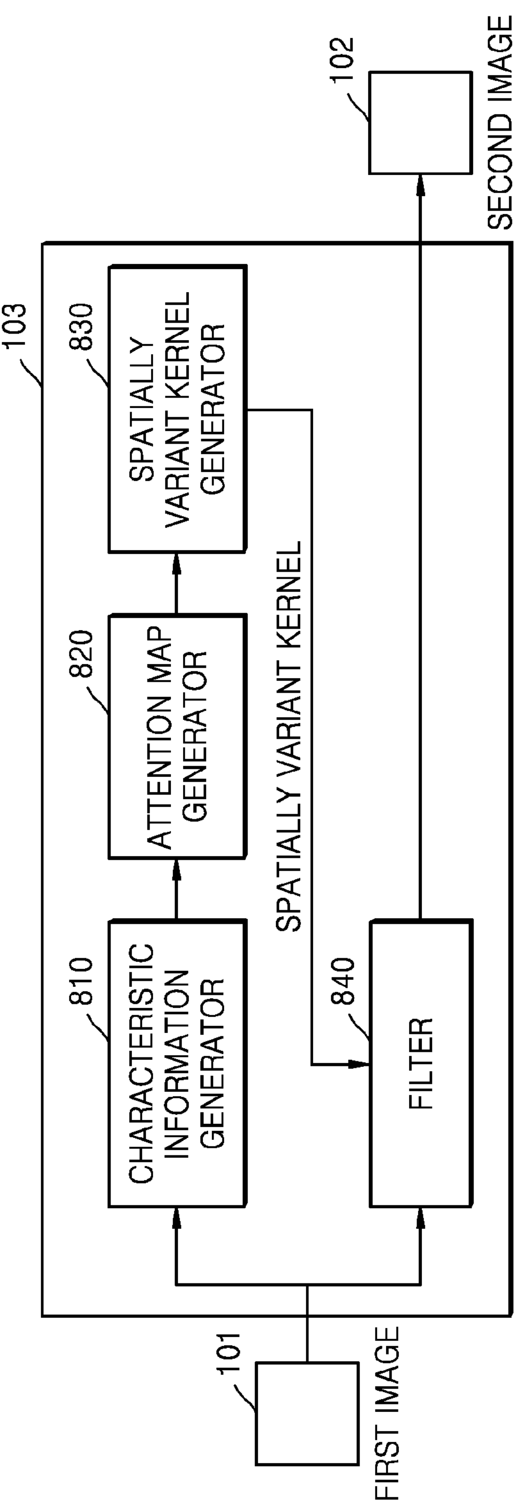
FIG. 8 is a diagram illustrating an image processing network according to an embodiment of the disclosure.

FIG. 8 is a diagram illustrating an image processing network according to an embodiment of the disclosure.

Referring to FIG. 2, the image processing network 103 according to an embodiment of the disclosure may include a characteristic information generator 810, an attention map generator 820, a spatially variant kernel generator 830, and a filter 840.

The image processing network 103 according to an embodiment of the disclosure may include a structure in which the first image 101 is received and the second image 102 is output.

The characteristic information generator 210 according to an embodiment of the disclosure may obtain characteristic information of the first image 101. For example, the characteristic information of the first image 101 may include similarity information between each of a plurality of pixels included in the first image 101 and a neighboring pixel. In this regard, the similarity information may be information representing a difference between a pixel value of each of the pixels and a pixel value of a neighboring pixel located around each of the pixels. A method of generating the similarity information is described in detail with reference to FIGS. 9 to 10B.

Also, the characteristic information of the first image 101 may include frequency characteristic information of the first image 101. A method of generating the frequency characteristic information of the first image 101 is described in detail with reference to FIG. 11.

Also, the characteristic information of the first image 101 may include domain transformation information of the first image 101, gradient characteristic information of the first image 101, region characteristic information of the first image 101, etc., but is not limited thereto.

Figure 9:
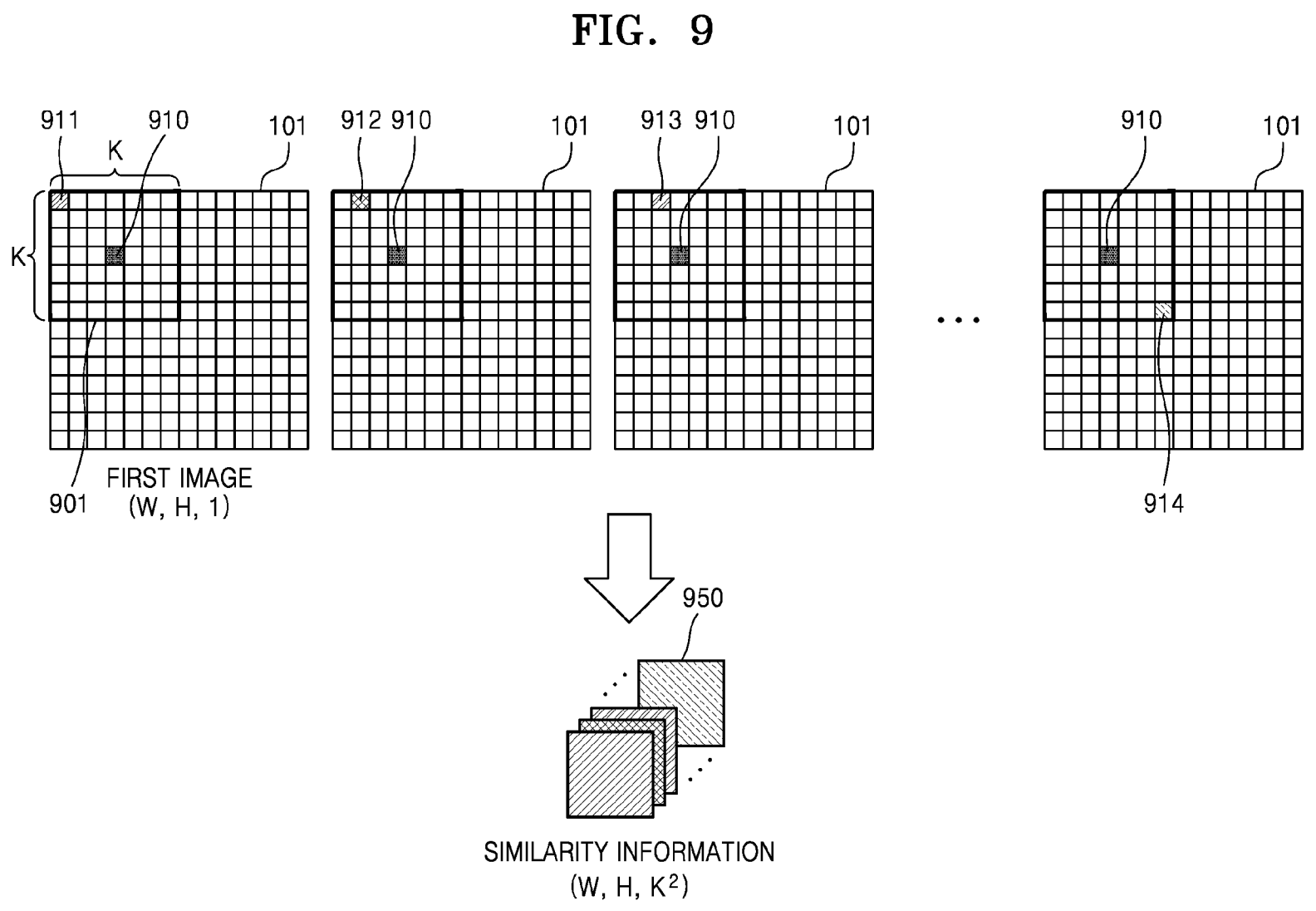

FIG. 9 is a reference diagram illustrating a method of generating similarity information according to an embodiment of the disclosure.

The characteristic information generator 210 according to an embodiment of the disclosure may generate the similarity information, by calculating a difference between each of a plurality of pixels included in the first image 101 and a neighboring pixel. For convenience of description, in the embodiment of the disclosure, it is assumed that the width of the first image 101 is W, the height thereof is H, and the number of channels is 1.

Referring to FIG. 5, the characteristic information generator 810 may calculate a difference value between a first pixel 910 and each of $K^2$ pixels included in a first region 901 with respect to the first pixel 910 among a plurality of pixels included in the first image 101. In this regard, K×K that is the size of the first region 901 may be determined based on the size of a spatial kernel described below.

The characteristic information generator 810 may obtain $K^2$ difference values with respect to the first pixel 910, by calculating a difference value between the first pixel 910 and each of $K^2$ pixels included in the first region 901. For example, as illustrated in FIG. 9, the characteristic information generator 810 may calculate a difference value between the first pixel 910 and a first neighboring pixel 911, a difference value between the first pixel 910 and a second neighboring pixel 912, a difference value between the first pixel 910 and a third neighboring pixel 913, and a difference value between the first pixel 910 and a fourth neighboring pixel 914. In the same manner, the characteristic information generator 810 may obtain $K^2$ difference values with respect to each of the other pixels included in the first image 101, other than the first pixel 910. For example, the characteristic information generator 810 may obtain $K^2$ difference values from neighboring pixels, by using each of the other pixels other than the first pixel 910 as a center pixel.

The characteristic information generator 810 may arrange $K^2$ difference values with respect to each of the pixels in similarity information 950 in a channel direction of the corresponding pixel, and accordingly, the size of the similarity information 950 may be W×H, and the number of channels may be $K^2$.

A first channel image of the similarity information 350 according to an embodiment of the disclosure may represent a difference value between each of the pixels included in the first image 101 and a neighboring pixel (e.g., a pixel at a position shifted by (K−1)/2 pixels to the left side and by (K−1)/2 pixels to the upper side with respect to each of the pixels) having a first relative position with respect to each of the pixels. Also, a second channel image of the similarity information 950 may represent a difference value between each of the pixels included in the first image 101 and a neighboring pixel (e.g., a pixel at a position shifted by (K−1)/2-1 pixels to the left side and by (K−1)/2 pixels to the upper side with respect to each of the pixels) having a second relative position with respect to each of the pixels. However, the disclosure is not limited thereto.

Figure 10A:
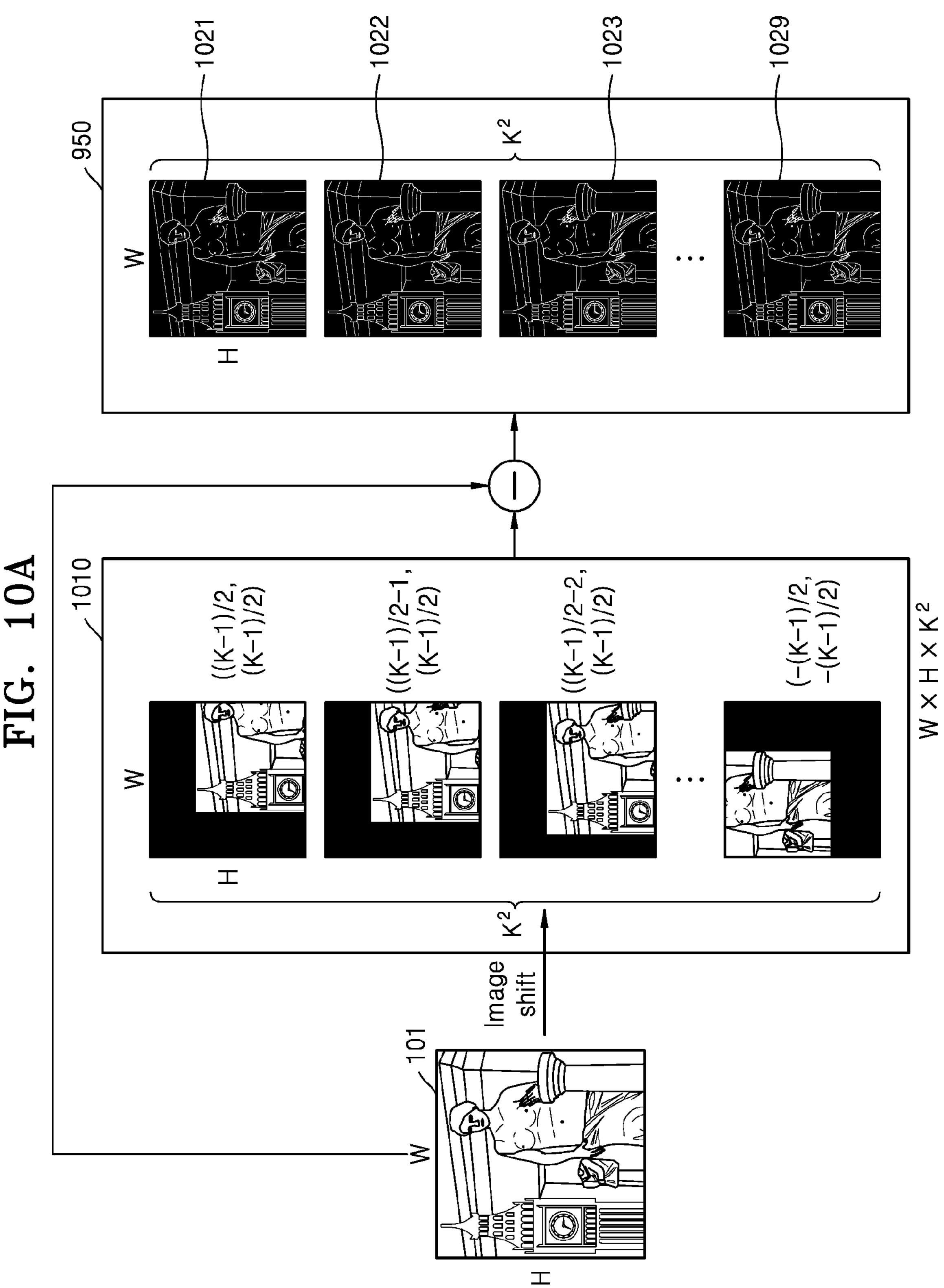
FIGS. 10A and 10B are reference diagrams illustrating methods of obtaining similarity information according to an embodiment of the disclosure.
Figure 10B:
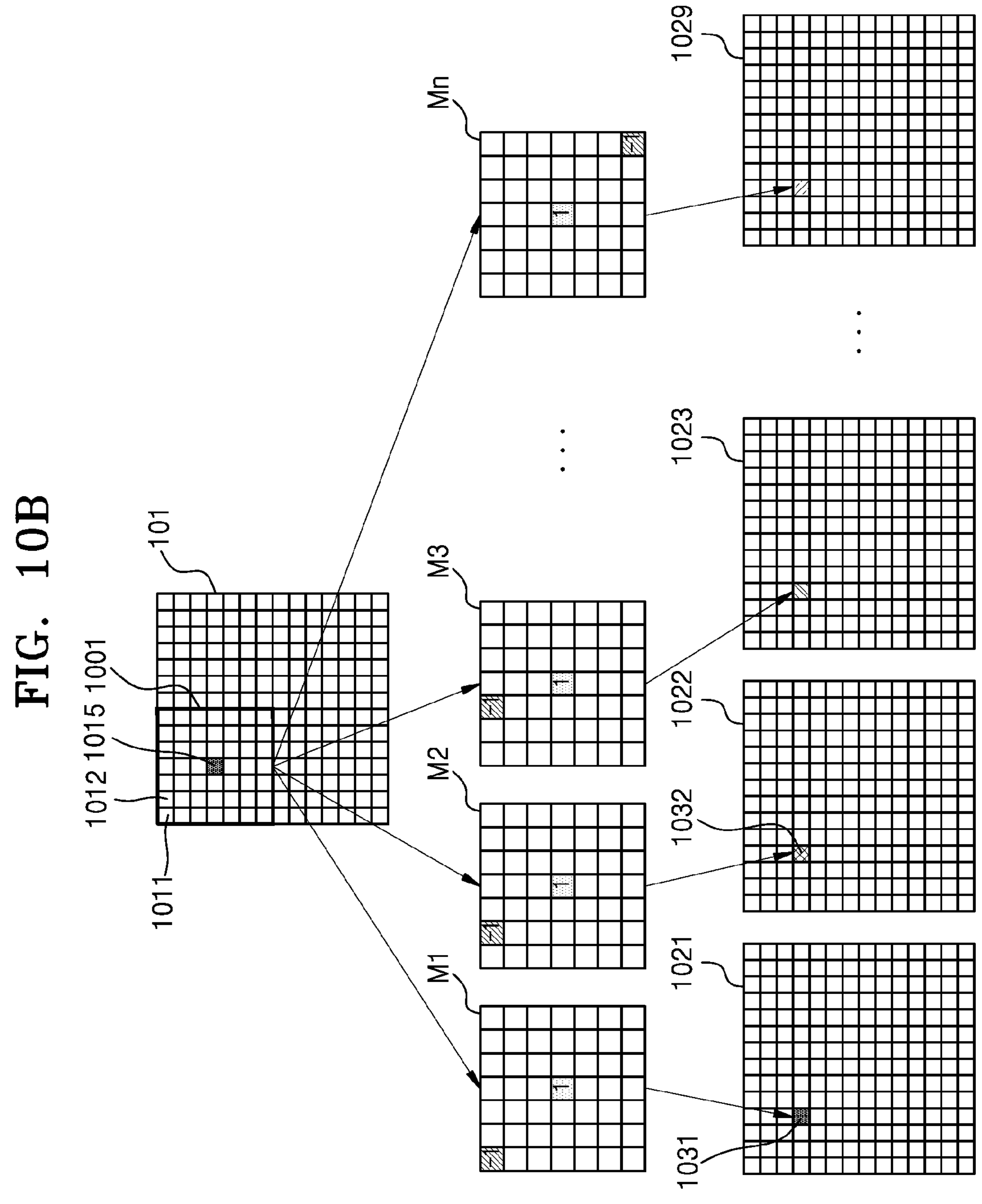

FIGS. 10A and 10B are reference diagrams illustrating methods of obtaining similarity information according to an embodiment of the disclosure.

Referring to FIG. 10A, the characteristic information generator 810 according to an embodiment of the disclosure may obtain $K^2$ images 1010 by shifting each of a plurality of pixels included in the first image 101 in a horizontal direction by p pixels (−(K−1)/2≤p≤(K−1)/2, where p is an integer) and shifting each of the pixels by q pixels (−(K−1)/2 sq≤(K−1)/2, where q is an integer). In this regard, each of the $K^2$ images 1010 may have the same size W×H as that of the first image 10.

The characteristic information generator 810 may obtain the similarity information 950 by calculating a difference image between each of the $K^2$ images 1010 and the first image 101. Accordingly, as described with reference to FIG. 9, the size of the similarity information 950 may be W×H, and the number of channels may be $K^2$.

Referring to FIG. 10B, the characteristic information generator 810 according to an embodiment of the disclosure may obtain the similarity information, by performing mask processing on the first image 101.

The characteristic information generator 810 may perform mask processing through a convolution operation between the first image 101 and each of mask filters M1, M2, M3, . . . , Mn. In this regard, "n" may be $K^2-1$, and the characteristic information generator 810 may generate $K^2-1$ channel images 1021, 1022, 1023, . . . , 1029 included in the similarity information 950, through mask processing using $K^2-1$ mask filters. For example, the characteristic information generator 210 may generate a first channel image 1021 of the similarity information 950, through a convolution operation between the first image 101 and the first mask filter M1, and generate a second channel image 1022 of the similarity information 950, through a convolution operation between the first image 101 and the second mask filter M2. Also, the characteristic information generator 210 may generate a third channel image 1023 of the similarity information 950 through a convolution operation between the first image 101 and the third mask filter M3 and generate a $K^2-1$-th channel image 1029 of the similarity information 950 through a convolution operation between the first image 101 and the n-th mask filter Mn.

Referring to FIG. 10B, the characteristic information generator 810 may calculate a pixel value included in the similarity information 950, by respectively multiplying and summing K×K pixel values included in a first region 1001 of the first image 101 and K×K pixel values (parameter values) included in each of the mask filters M1, M2, M3, . . . , Mn.

In this regard, the parameter values included in the mask filters M1, M2, M3, . . . , Mn may be determined according to the position of a neighboring pixel for calculating the similarity information 950. For example, the first mask filter M1 may be a mask filter for calculating similarity information between a center pixel and a neighboring pixel having a first relative position (e.g., a position shifted by (K−1)/2 pixels to the left side and by (K−1)/2 pixels to the upper side with respect to a reference pixel) with respect to the center pixel. Accordingly, the first mask filter M1 may have '1' as a center pixel value, '−1' as a pixel value having the first relative position with respect to the center pixel, and '0' as the other pixel values.

The characteristic information generator 810 according to an embodiment of the disclosure may calculate a value of a second pixel 1031 included in the first channel image 1021 of the similarity information 950, by performing a convolution operation between the first mask filter M1 and the first region 1001 with respect to a first pixel 1015. In this regard, the position of the first pixel 1015 in the first image 10 may be equal to the position of the second pixel 1031 in the first channel image 1021 of the similarity information 950. The value of the second pixel 1031 included in the first channel image 1021 may be obtained by subtracting the value of a pixel 1011 having the first relative position with respect to the first pixel 1015 from the value of the first pixel 1015.

According to the convolution operation using the first mask filter M1, each of the pixels included in the first image 101 may be located at the center of the first mask filter M1 sliding in the horizontal direction and the vertical direction. In this regard, the reference pixel may be located at the center of a region covered by the first mask filter M1 sliding and shifting over the first image 101. The characteristic information generator 810 may calculate pixel values included in the first channel image 1021, by performing a convolution operation between a changed region and the first mask filter M1.

Also, the second mask filter M2 may be a mask filter for calculating similarity information between the center pixel and a neighboring pixel having a second relative position (e.g., a position shifted by (K−1)/2−1 pixels to the left side and by (K−1)/2 pixels to the upper side with respect to the reference pixel) with respect to the center pixel. Accordingly, the first mask filter M2 may have '1' as a center pixel value, '−1' as a pixel value having the second relative position with respect to the center pixel, and '0' as the other pixel values.

The characteristic information generator 2810 may calculate a value of a third pixel 1032 included in the second channel image 1022 of the similarity information 950, by performing a convolution operation between the second mask filter M2 and the first region 1001 with respect to the first pixel 1015. In this regard, the position of the first pixel 1015 in the first image 101 may be equal to the position of the third pixel 1032 in the second channel image 1022. Accordingly, the value of the third pixel 1032 included in the second channel image 1022 may be obtained by subtracting the value of a pixel 1012 having a second relative position with respect to the first pixel 1015 from the value of the first pixel 1015.

In the same manner, the characteristic information generator 810 may change a region that is a convolution operation target such that each of the pixels included in the first image 101 may be located at the center of the region that is the convolution operation target, and calculate pixel values included in the second channel image 1022, by performing a convolution operation between the second mask filter M2 and the changed region.

Also, the third mask filter M3 may be a mask filter for calculating similarity information between the center pixel and a neighboring pixel having a third relative position with respect to the center pixel, and the n-th mask filter Mn may be a mask filter for calculating similarity information between the center pixel and a neighboring pixel having an n-th relative position with respect to the center pixel.

As illustrated in and described with reference to FIG. 10B, the characteristic information generator 210 may according to an embodiment of the disclosure may obtain the similarity information including difference values between each of the pixels included in the first image 101 and neighboring pixels having the first to ($K^2$−1)th relative positions with respect to each of the pixels, by performing mask processing using $K^2$−1 mask filters. For example, the characteristic information generator 810 may generate the first to ($K^2$−1)th channel images 1021, 1022, 1023, . . . , 1029 of the similarity information 950 by using the first to ($K^2$−1)th mask filters M1, M2, M3, . . . , Mn.

Also, the similarity information 950 according to an embodiment of the disclosure may include a $K^2$-th channel image representing the similarity information with respect to itself with respect to each of the pixels included in the first image 101. Thus, all pixel values of the $K^2$-th channel image may be '0'.

Moreover, the methods of obtaining the similarity information 350 illustrated in and described with reference to FIGS. 9, 10A, and 10B are merely examples, and the characteristic information generator 810 may use various methods to obtain the similarity information between each of the pixels included in the first image 101 and a neighboring pixel.

FIG. 11 is a diagram illustrating a method of generating frequency characteristic information of a first image according to an embodiment of the disclosure.

The characteristic information generator 810 according to an embodiment of the disclosure may generate the frequency characteristic information of the first image 101. For example, the characteristic information generator 810 may obtain at least one piece of characteristic information, by performing filtering on the first image 101.

For example, the characteristic information generator 810 may obtain the frequency characteristic information, by performing filtering using a Gaussian kernel or a discrete cosine transform (DCT) or a wavelet transform, etc.

Referring to FIG. 11, the characteristic information generator 810 may perform a convolution operation, by applying four filter kernels 1111, 1112, 1113, and 1114 to the first image 101. The characteristic information generator 810 may obtain first filtering information 1121 by performing a convolution operation between the first image 1111 and a first filter kernel 511, may obtain second filtering information 1122 by performing a convolution operation between the first image 101 and a second filter kernel 1112, may obtain third filtering information 1123 by performing a convolution operation between the first image 101 and a third filter kernel 1113, and may obtain fourth filtering information 1124 by performing a convolution operation between the first image 101 and a fourth filter kernel 1114. Four filter kernels are illustrated in and described with reference to FIG. 11, but the disclosure is not limited thereto. Also, the filter kernels may be Gaussian kernels, but are not limited thereto.

Weight values of the filter kernels 1111, 1112, 1113, and 1114 for filtering the first image 101 may be preset values.

The characteristic information generator 810 may obtain first frequency characteristic information 1131 by calculating a difference between the first filtering information 1121 and the second filtering information 1122, may obtain second frequency characteristic information 1132 by calculating a difference between the second filtering information 1122 and the third filtering information 1123, and may obtain third frequency characteristic information 1133 by calculating a difference between the third filtering information 1123 and the fourth filtering information 1124.

In this regard, the first to third frequency characteristic information 1131, 1132, and 1133 may be high frequency characteristic information, middle frequency characteristic information, and low frequency characteristic information, respectively. The high frequency characteristic information, the middle frequency characteristic information, and the low frequency characteristic information may be classified based on predetermined high, middle, and low frequency ranges.

Also, the characteristic information generator 810 according to an embodiment of the disclosure may extract at least one piece of sub-characteristic information from the first to third frequency characteristic information 1131, 1132, and 1133. For example, the characteristic information generator 810 may extract first sub-frequency characteristic information 1151 through a convolution operation between the first frequency characteristic information 1131 and a first sub-kernel 1141, and may extract second sub-frequency characteristic information 1152 through a convolution operation between the second frequency characteristic information 1132 and a second sub-kernel 1142. Also, the characteristic information generator 810 may extract third sub-frequency characteristic information 1153 through a convolution operation between the third frequency characteristic information 1133 and a third sub-kernel 1143.

The characteristic information of the first image 101 according to an embodiment of the disclosure may include a plurality of pieces of frequency characteristic information (e.g., the first to third frequency characteristic information 1131, 1132, and 1133) or a plurality of pieces of sub-frequency characteristic information (e.g., the first to third sub-frequency characteristic information 1151, 1152, and 1153).

Also, the characteristic information generator 810 may generate gradient characteristic information of the first image 101. Gradient features according to an embodiment of the disclosure may be determined based on the feature of an edge appearing in each of a plurality of pixels included in the first image 101, and may include at least one of strength feature, angle feature, or coherence. For example, the strength feature may be determined such that the sharper the edge, the greater the strength. The angle feature may represent the direction of the edge. The coherence may represent a measure of how directional the edge is. The coherence may be higher when the edge is straight than when the edge is curved.

The characteristic information generator 810 according to an embodiment of the disclosure may determine the gradient feature of the first image based on eigenvalues and eigenvector calculated through an eigen component analysis of the gradient value of each of the pixels included in the first image 101.

The characteristic information of the first image 101 according to an embodiment of the disclosure may include a plurality of pieces of gradient characteristic information of the first image 101.

Referring back to FIG. 8, the attention map generator 820 may generate an attention map based on the characteristic information. Hereinafter, for convenience of description, an example in which the characteristic information of the first image 101 is the similarity information 950 is described.

The attention map generator 220 according to an embodiment of the disclosure may generate the attention map based on the similarity information 950. When the attention map is generated based on the similarity information 950, the quality of an image on which image processing is performed may be improved, by using the attention map generated to give great weights to neighboring pixels having similar pixel values to perform image processing.

The attention map generator 820 may generate an attention map representing weight information corresponding to each of the pixels, based on the similarity information 950 between each of the pixels included in the first image 101 and neighboring pixels. A method of generating the attention map is described in detail with reference to FIG. 12.

Figure 12:
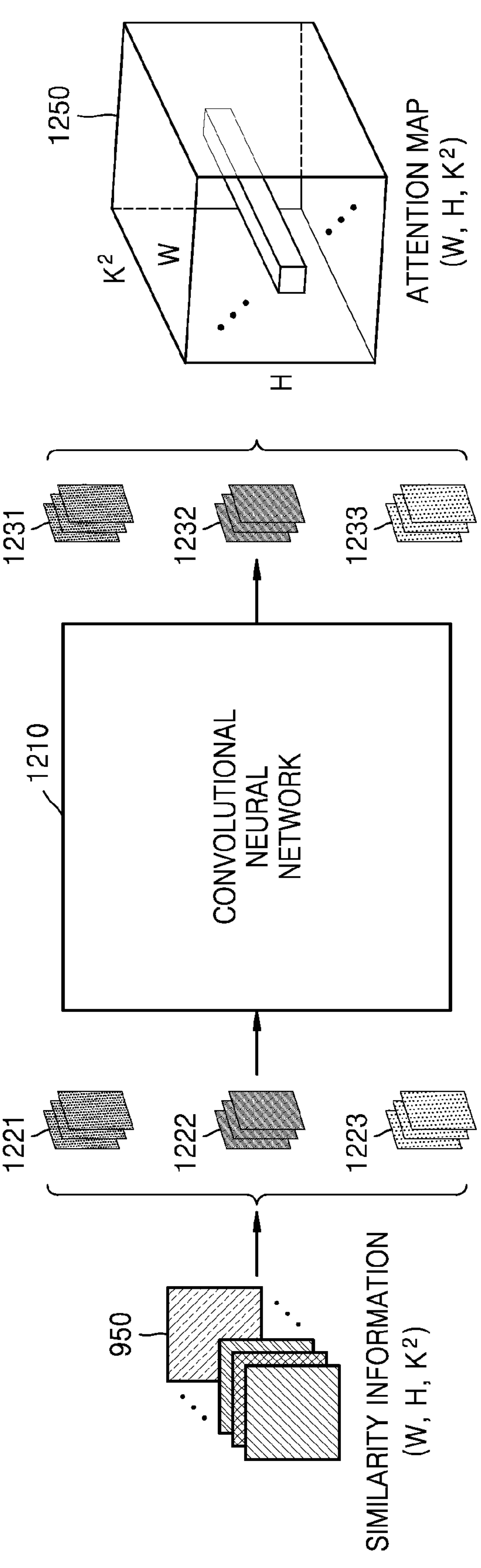
FIG. 12 is a reference diagram illustrating a method of generating an attention map according to an embodiment of the disclosure.

FIG. 12 is a reference diagram illustrating a method of generating an attention map according to an embodiment of the disclosure.

Referring to FIG. 12, the attention map generator 820 may generate an attention map 1250 by using a convolutional neural network 1210. The convolutional neural network 1210 according to an embodiment of the disclosure may include one or more layers and may receive characteristic information obtained by the characteristic information generator 810 according to an embodiment of the disclosure. In this regard, the characteristic information may be divided into a plurality of groups, and the plurality of divided groups may be respectively input into different layers.

In FIG. 12, the characteristic information is described as the similarity information 950. As illustrated in FIG. 12, the similarity information 950 having $K^2$ channels may be divided into a first group 1221, a second group 1222, a third group 1223, and a fourth group 1224 in units of channels and may be input into the convolutional neural network 1210. Although the description has been given with respect to the similarity information 950 in FIG. 12, even when the characteristic information is frequency characteristic information, gradient characteristic information, etc., the characteristic information may be divided into a plurality of groups and may be input into different layers included in the convolutional neural network 1210.

Moreover, a method of dividing the similarity information 950 into a plurality of groups is described in detail with reference to FIG. 13.

Referring back to FIG. 12, the attention map generator 820 according to an embodiment of the disclosure may input a plurality of pieces of information 1221, 1222, and 1223 of a plurality of groups into layers included in the convolutional neural network 1210. For example, the first input information 1221, the second input information 1222, and the third input information 1223 may be respectively input into a first convolution layer, a second convolution layer, and a third convolution layer. The attention map generator 820 may perform an operation on the plurality of pieces of input information 1221, 1222, and 1223, by using the convolutional neural network 1210.

Referring to FIG. 12, the attention map generator 820 may obtain a plurality of pieces of output information 1231, 1232, and 1233 respectively corresponding to the plurality of pieces of input information 1221, 1222, and 1223 from different layers included in the convolutional neural network 1210. For example, the first output information 1231, the second output information 1232, and the third output information 1233 may be output from different layers.

The attention map generator 820 may generate the attention map 1250 based on a plurality of pieces of output information. A method of generating the attention map 850 based on the plurality of pieces of output information is described below in detail with reference to FIG. 15. The size of the attention map 1250 generated by the attention map generator 820 may be W×H, and the number of channels may be $K^2$.

Figure 13:
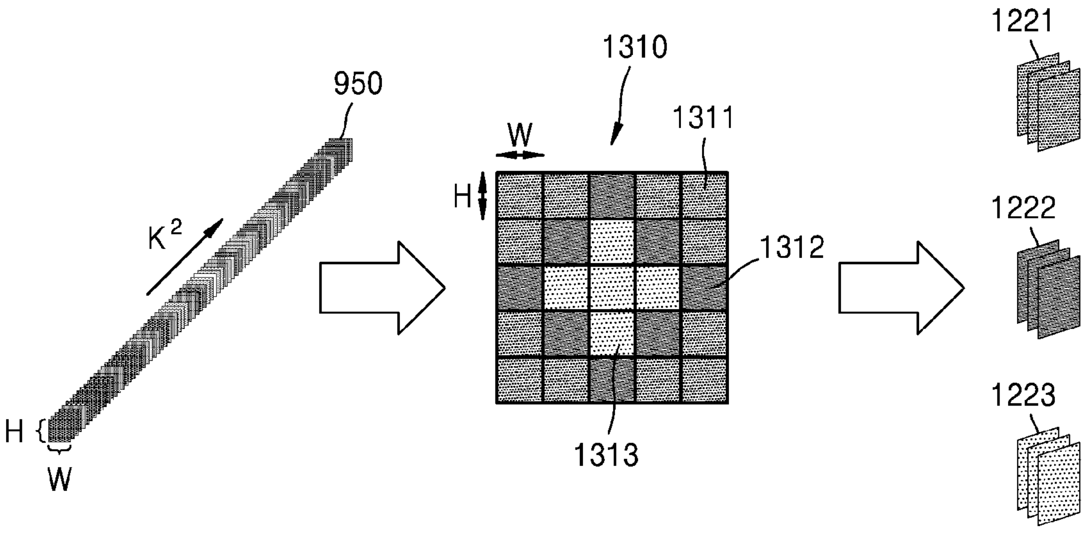
FIG. 13 is a diagram illustrating a method of dividing similarity information into a plurality of groups according to an embodiment of the disclosure.

FIG. 13 is a diagram illustrating a method of dividing similarity information into a plurality of groups according to an embodiment of the disclosure.

Referring to FIG. 13, the size of the similarity information 950 according to an embodiment of the disclosure may be W×H, and the number of channels may be $K^2$. Also, the similarity information 950 may be divided into a plurality of groups according to a feature value for each of channels included in the similarity information 950. For example, as illustrated in FIG. 13, each of the channels included in the similarity information 950 may have an intensity value. In this regard, the channel-wise intensity may be obtained by summing all pixel values included in one channel, but the disclosure is not limited thereto.

The attention map generator 820 may divide the similarity information 950 into a plurality of groups in units of channels according to the channel-wise intensity. For example, the attention map generator 820 may divide the similarity information 950 into the plurality of groups according to the magnitude of the channel-wise intensity.

Referring to FIG. 13, the channels included in the similarity information 950 according to an embodiment of the disclosure may include channel numbers (indexes) in order, and for example, a channel number '0' may be assigned to a first channel included in the similarity information 950 and a channel number '$K^2-1$' may be assigned to a last channel. In a two-dimensional image 1310 in which the channels included in the similarity information 950 are arranged from left to right and from top to bottom in the order of channel numbers, the channels located in a first region 1311 may be classified as a first group 1221, the channels located in a second region 1312 may be classified as a second group 1222, and the channels located in a third region 1313 may be classified as a third group 1223.

When the similarity information 950 includes 25 channels, the first group 1221 may include 12 channels, the second group 1222 may include 8 channels, and the third group 1223 may include 5 channels.

In FIG. 13, an example in which the similarity information 950 is divided into a plurality of groups according to the magnitude of the channel-wise intensity has been illustrated and described, but the disclosure is not limited thereto, and the similarity information 950 may be divided into a plurality of groups according to different feature values for each channel.

Figure 14:
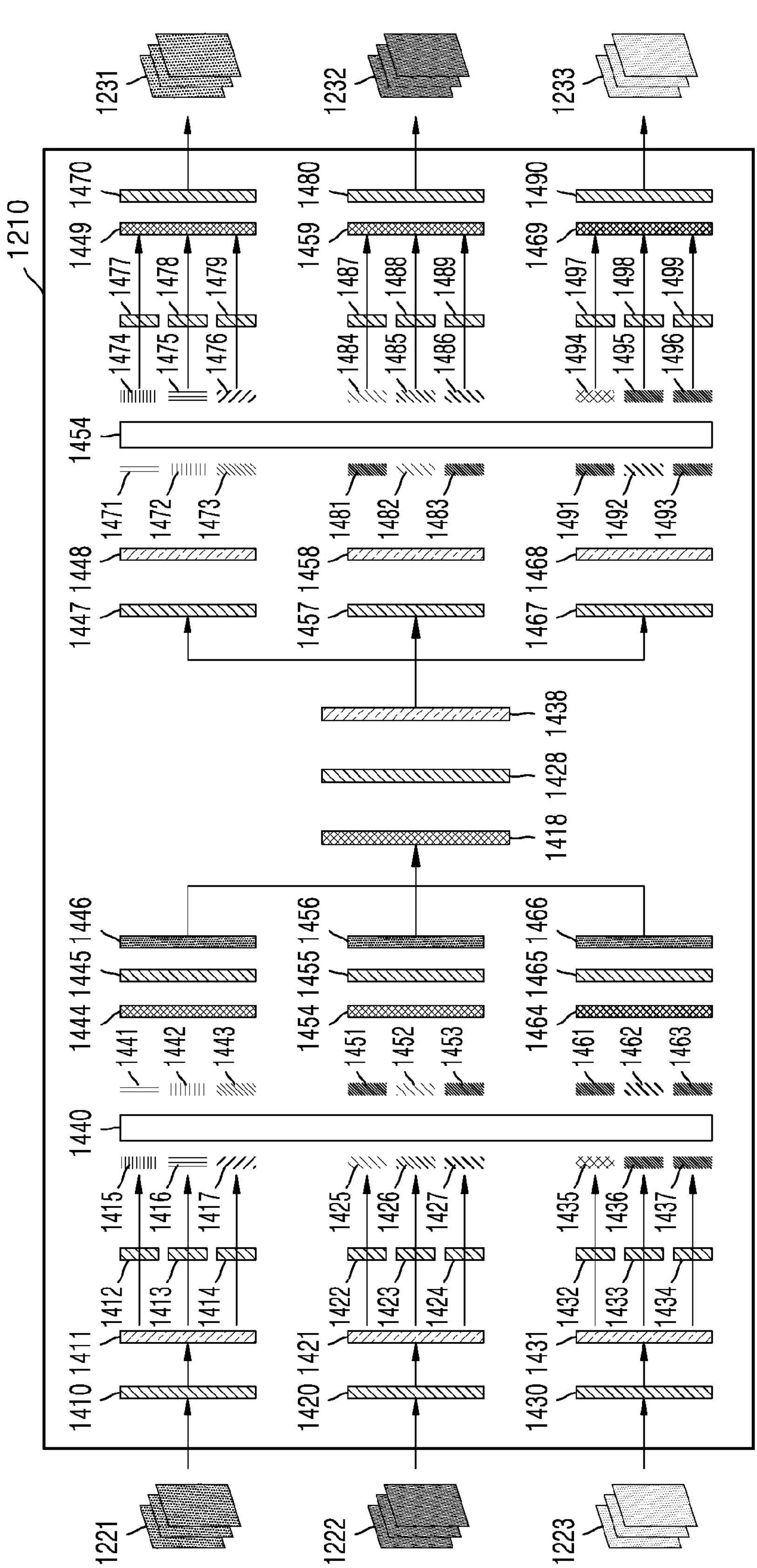
FIG. 14 is a diagram illustrating a structure of a convolutional neural network for generating an attention map according to an embodiment of the disclosure.

FIG. 14 is a diagram illustrating a structure of a convolutional neural network for generating an attention map according to an embodiment of the disclosure.

Referring to FIG. 14, the convolutional neural network 1210 according to an embodiment of the disclosure may include one or more convolution layers, one or more split layers, one or more concatenation layers, and one or more activation layers.

Each of the first to third groups 1221, 1222, and 1223 according to an embodiment of the disclosure may be input into a convolution layer. For example, the first group 1221 (hereinafter referred to as first input information) may be input into a first convolution layer 1410, the second group 1222 (hereinafter referred to as second input information) may be input into a second convolution layer 1420, and the third group 1223 (hereinafter referred to as first input information) may be input into a third convolution layer 1430.

First feature data may be obtained by performing a convolution operation between the first input information 1221 into the first convolution layer 1410 and a first kernel included in the first convolution layer 1410. Also, second feature data may be obtained by performing a convolution operation between the second input information 1222 into the second convolution layer 1420 and a second kernel included in the second convolution layer 1420. Also, third feature data may be obtained by performing a convolution operation between the third input information 1223 into the third convolution layer 1420 and a third kernel included in the third convolution layer 1430.

The first feature data may be input to a first split layer 1411. In the first split layer 1411, a plurality of channels included in the first feature data may be divided into a plurality of groups. For example, the plurality of channels included in the first feature data may be divided into three groups. However, the disclosure is not limited thereto. Hereinafter, for convenience of description, the three groups are referred to as 1-1th feature data, 1-2th feature data, and 1-3th feature data. Each of the three groups may be input to a convolution layer. For example, the 1-1th feature data may be input to a fourth convolution layer 1412, the 1-2th feature data may be input to a fifth convolution layer 1413, and the 1-3th feature data may be input to a sixth convolution layer 1414.

First middle data 1415 may be obtained by performing a convolution operation between the 1-1th feature data input to the fourth convolution layer 1412 and a fourth kernel included in the fourth convolution layer 1412. In addition, second middle data 1416 may be obtained by performing a convolution operation between the 1-2th feature data input to the fifth convolution layer 1413 and a fifth kernel included in the fifth convolution layer 1413. In addition, third middle data 1417 may be obtained by performing a convolution operation between the 1-3th feature data input to the sixth convolution layer 1414 and a sixth kernel included in the sixth convolution layer 1414.

Also, the second feature data may be input to a second split layer 1421, and, in the second split layer 1421, a plurality of channels included in the second feature data may be divided into a plurality of groups. For example, the plurality of channels included in the second feature data may be divided into three groups. However, the disclosure is not limited thereto. Hereinafter, for convenience of description, the three groups are referred to as 2-1th feature data, 2-2th feature data, and 2-3th feature data. Each of the three groups may be input to a convolution layer. For example, the 2-1th feature data may be input to a seventh convolution layer 1422, the 2-2th feature data may be input to a eighth convolution layer 1423, and the 2-3th feature data may be input to a ninth convolution layer 1424. Fourth to sixth middle data 1425, 1426, and 1427 may also be obtained with respect to the 2-1th feature data, the 2-2th feature data, and the 2-3th feature data, by using the seventh to ninth convolution layers 1422, 1423, and 1424, in the same manner as for the 1-1th feature data, the 1-2th feature data, and the 1-3th feature data. A method of performing convolution operations on the 2-1th feature data, the 2-2th feature data, and the 2-3th feature data is the same as the method of performing convolution operations on the 1-1th feature data, the 1-2th feature data, and the 1-3th feature data, and thus a detailed description thereof is omitted.

Also, the third feature data may be input to a third split layer 1431, and, in the third split layer 1431, a plurality of channels included in the third feature data may be divided into a plurality of groups. For example, the plurality of channels included in the third feature data may be divided into three groups. However, the disclosure is not limited thereto. Hereinafter, for convenience of description, the three groups are referred to as 3-1th feature data, 3-2th feature data, and 3-3th feature data. Each of the three groups may be input to a convolution layer. For example, the 3-1th feature data may be input to a tenth convolution layer 1432, the 3-2th feature data may be input to an eleventh convolution layer 1433, and the 3-3th feature data may be input to a twelfth convolution layer 1434. Seventh to ninth middle data 1435, 1436, and 1437 may be obtained with respect to the 3-1th feature data, the 3-2th feature data, and the 3-3th feature data, by using the tenth to twelfth convolution layers 1432, 1433, and 1434, in the same manner as for the 1-1th feature data, the 1-2th feature data, and the 1-3th feature data. A method of performing convolution operations on the 3-1th feature data, the 3-2th feature data, and the 3-3th feature data is the same as the method of performing convolution operations on the 1-1th feature data, the 1-2th feature data, and the 1-3th feature data, and thus a detailed description thereof is omitted.

The first to ninth middle data 1415, 1416, 1417, 1425, 1426, 1427, 1435, 1436, and 1437 according to an embodiment of the disclosure may be shuffled in the shuffling layer 1440, so that first to ninth shuffling data 1441, 1442, 1443, 1451, 1452, 1453, 1461, 1462, and 1463 may be obtained. For example, each of the first to ninth shuffling data 1441, 1442, 1443, 1451, 1452, 1453, 1461, 1462, and 1463 may include some channels included in at least two of the first to eighth or ninth middle data 1415, 1416, 1417, 1425, 1426, 1427, 1435, 1436, or 1437.

Specifically, the first shuffling data 1441 may be shuffled to include an i-th channel of the first middle data 1415, an i-th channel of the second middle data 1416, and an i-th channel of the third middle data 1417. Alternatively, the second shuffling data 1442 may be shuffled to include a j-th channel of the first middle data 1415, a j-th channel of the second middle data 1416, and a j-th channel of the third middle data 1417. Alternatively, the third shuffling data 1443 may be shuffled to include a k-th channel of the first middle data 1415, a k-th channel of the second middle data 1416, and a k-th channel of the third middle data 1417. However, the disclosure is not limited thereto, and shuffling may be performed in various ways.

The image processing apparatus 100 according to an embodiment of the disclosure may share information included in the first to ninth middle data 1415, 1416, 1417, 1425, 1426, 1427, 1435, 1436, and 1437 between the first to ninth middle data 1415, 1416, 1417, 1425, 1426, 1427, 1435, 1436, and 1437 by performing shuffling, thereby improving the performance of image processing.

The first to third shuffling data 1441, 1442, and 1443 may be input to a first concatenation layer 1444, and, in the first concatenation layer 1444, the image processing apparatus 100 may output first concatenation data obtained by concatenating the first to third shuffling data 1441, 1442, and 1443 in a channel direction to a thirteenth convolution layer 1445.

In the thirteenth convolution layer 1445, the image processing apparatus 100 may obtain fourth feature data, by performing a convolution operation between the first concatenation data and a thirteenth kernel included in the thirteenth convolution layer 1445.

The fourth feature data may be input to an activation layer 1446. In the activation layer 1446, the image processing apparatus 100 may obtain first output data by applying an activation function to the fourth feature data input to the activation layer 1446.

In addition, the fourth to sixth shuffling data 1451, 1452, and 1453 may be input to a second concatenation layer 1454, and, in the second concatenation layer 1454, the image processing apparatus 100 may output second concatenation data obtained by concatenating the fourth to sixth shuffling data 1451, 1452, and 1453 in the channel direction to a fourteenth convolution layer 1455.

In the fourteenth convolution layer 1455, the image processing apparatus 100 may obtain fifth feature data, by performing a convolution operation between the second concatenation data and a fourteenth kernel included in the fourteenth convolution layer 1455.

The fifth feature data may be input to an activation layer 1456. In the activation layer 1456, the image processing apparatus 100 may obtain second output data by applying an activation function to the fifth feature data input to the activation layer 1456.

In addition, the seventh to ninth shuffling data 1461, 1462, and 1463 may be input to a third concatenation layer 1464, and, in the third concatenation layer 1464, the image processing apparatus 100 may output third concatenation data obtained by concatenating the seventh to ninth shuffling data 1461, 1462, and 1463 in the channel direction to a fifteenth convolution layer 1465.

In the fifteenth convolution layer 1465, the image processing apparatus 100 may obtain sixth feature data, by performing a convolution operation between the third concatenation data and a fifteenth kernel included in the fifteenth convolution layer 1465.

The sixth feature data may be input to an activation layer 1466. In the activation layer 1466, the image processing apparatus 100 may obtain third output data by applying an activation function to the sixth feature data input to the activation layer 1466.

The first to third output data may be input to a fourth concatenation layer 1418. In the fourth concatenation layer 1418, the image processing apparatus 100 may obtain output information by concatenating the first to third output data in the channel direction.

The obtained output information may be input to a sixteenth convolution layer 1428. In the sixteenth convolution layer 1428, the image processing apparatus 100 may obtain seventh feature data, by performing a convolution operation between the output information and a sixteenth kernel included in the sixteenth convolution layer 1428. The seventh feature data may be input to a fourth split layer 1438. In the fourth split layer 1438, the seventh feature data may be divided into three groups (7-1th feature data, 7-2th feature data, and 7-3th feature data). Each of the three groups may be input to a convolution layer.

For example, the 7-1th feature data is input to a seventeenth convolution layer 1447, and a convolution operation between the 7-1th feature data and a seventeenth kernel included in the seventeenth convolution layer 1447 is performed, so that eighth feature data may be obtained.

In addition, the 7-2th feature data is input to an eighteenth convolution layer 1457, and a convolution operation between the 7-2th feature data and an eighteenth kernel included in the eighteenth convolution layer 1457 is performed, so that ninth feature data may be obtained.

In addition, the 7-3th feature data is input to a nineteenth convolution layer 1467, and a convolution operation between the 7-3th feature data and a nineteenth kernel included in the nineteenth convolution layer 1467 is performed, so that tenth feature data may be obtained.

The eighth feature data may be input to a fifth split layer 1448. In the fifth split layer 1448, a plurality of channels included in the eighth feature data may be divided into a plurality of groups. For example, the plurality of channels included in the eighth feature data may be divided into three groups. Hereinafter, for convenience of description, the three groups are referred to as 8-1th feature data 1471, 8-2th feature data 1472, and 8-3th feature data 1473.

Also, the ninth feature data may be input to a sixth split layer 1458. In the sixth split layer 1458, a plurality of channels included in the ninth feature data may be divided into a plurality of groups. For example, the plurality of channels included in the ninth feature data may be divided into three groups. Hereinafter, for convenience of description, the three groups are referred to as 9-1th feature data 1481, 9-2th feature data 1482, and 9-3th feature data 1483.

Also, the tenth feature data may be input to a seventh split layer 1468. In the seventh split layer 1468, a plurality of channels included in the tenth feature data may be divided into a plurality of groups. For example, the plurality of channels included in the tenth feature data may be divided into three groups. Hereinafter, for convenience of description, the three groups are referred to as 10-1th feature data 1491, 10-2th feature data 1492, and 10-3th feature data 1493.

The 8-1th feature data 1471, the 8-2th feature data 1472, the 8-3th feature data 1473, the 9-1th feature data 1481, the 9-2th feature data 1482, the 9-3th feature data 1483, the 10-1th feature data 1491, the 10-2th feature data 1492, and the 10-3th feature data 1493 according to an embodiment of the disclosure may be shuffled in the second shuffling layer 1454. Accordingly, shuffled tenth to eighteenth shuffling data 1474, 1475, 1476, 1484, 1485, 1486, 1494, 1495, and 1496 may be obtained. For example, each of the tenth to eighteenth shuffling data 1474, 1475, 1476, 1484, 1485, 1486, 1494, 1495, and 1496 may include some channels included in at least two of the 8-1th feature data 1471, the 8-2th feature data 1472, the 8-3th feature data 1473, the 9-1th feature data 1481, the 9-2th feature data 1482, the 9-3th feature data 1483, the 10-1th feature data 1491, the 10-2th feature data 1492, or the 10-3th feature data 1493.

The image processing apparatus 100 according to an embodiment of the disclosure may share information included in the 8-1th feature data 1471, the 8-2th feature data 1472, the 8-3th feature data 1473, the 9-1th feature data 1481, the 9-2th feature data 1482, the 9-3th feature data 1483, the 10-1th feature data 1491, the 10-2th feature data 1492, and the 10-3th feature data 1493, between 8-1th feature data 1471, the 8-2th feature data 1472, the 8-3th feature data 1473, the 9-1th feature data 1481, the 9-2th feature data 1482, the 9-3th feature data 1483, the 10-1th feature data 1491, the 10-2th feature data 1492, and the 10-3th feature data 1493, by performing shuffling, thereby improving the performance of image processing.

Each of the tenth to eighteenth shuffling data 1474, 1475, 1476, 1484, 1485, 1486, 1494, 1495, and 1496 may be input to a convolution layer. For example, the tenth to twelfth shuffling data 1474, 1475, and 1476 are respectively input to twentieth to twenty-second convolution layers 1477, 1478, and 1479, and a convolution operation is performed thereon, so that twentieth to twenty-second feature data may be obtained.

In addition, the thirteenth to fifteenth shuffling data 1484, 1485, and 1486 are respectively input to twenty-third to twenty-fifth convolution layers 1487, 1488, and 1489, and a convolution operation is performed thereon, so that twenty-third to twenty-fifth feature data may be obtained.

In addition, the sixteenth to eighteenth shuffling data 1494, 1495, and 1496 are respectively input to twenty-sixth to twenty-eighth convolution layers 1497, 1498, and 1499, and a convolution operation is performed thereon, so that twenty-sixth to twenty-eighth feature data may be obtained.

The twentieth to twenty-second feature data according to an embodiment of the disclosure may be input to a fifth concatenation layer 1449, and, in the fifth concatenation layer 1449, fifth concatenation data may be obtained by concatenating the twentieth to twenty-second feature in a channel direction, and may be output to a twenty-ninth convolution layer 1470.

In the twenty-ninth convolution layer 1470, the image processing apparatus 100 may obtain the first output information 1231, by performing a convolution operation between the fifth concatenation data and a twenty-ninth convolution kernel included in the twenty-ninth convolution layer 1470.

The twenty-third to twenty-fifth feature data according to an embodiment of the disclosure may be input to a sixth concatenation layer 1459, and, in the sixth concatenation layer 1459, sixth concatenation data may be obtained by concatenating the twenty-third to twenty-fifth feature data in the channel direction, and may be output to a thirtieth convolution layer 1480.

In the thirtieth convolution layer 1480, the image processing apparatus 100 may obtain the second output information 1232, by performing a convolution operation between the sixth concatenation data and a thirtieth kernel included in the thirtieth convolution layer 1480.

The twenty-sixth to twenty-eighth feature data according to an embodiment of the disclosure may be input to a seventh concatenation layer 1469, and seventh concatenation data may be obtained by concatenating the twenty-sixth to twenty-eighth feature data in the channel direction, and may be output to a thirty-first convolution layer 1490.

In the thirty-first convolution layer 1490, the image processing apparatus 100 may obtain the third output information 1233, by performing a convolution operation between the seventh concatenation data and a thirty-first included in the thirty-first convolution layer 1490.

Figure 15:
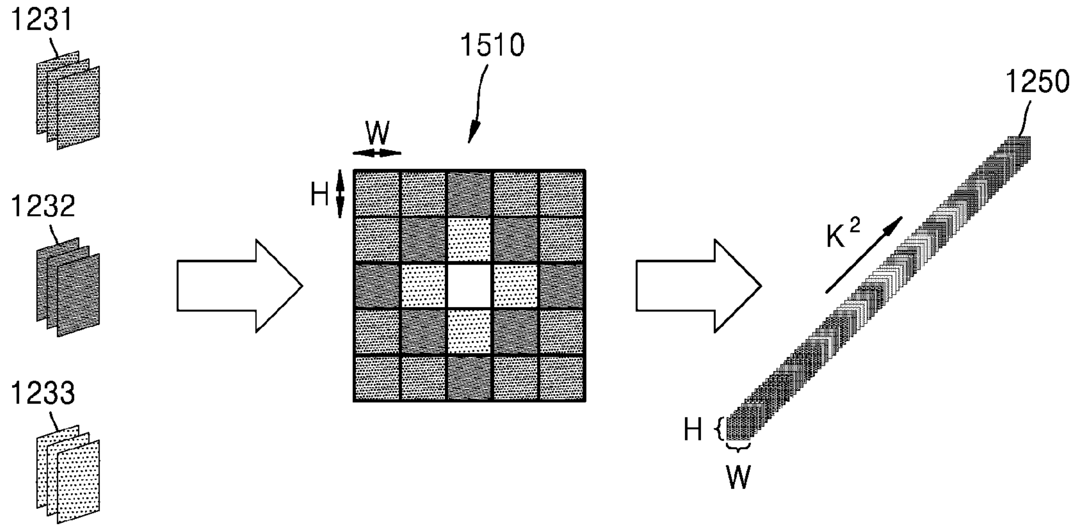
FIG. 15 is a diagram illustrating an operation of generating an attention map according to an embodiment of the disclosure.

FIG. 15 is a diagram illustrating an operation of generating an attention map according to an embodiment of the disclosure.

Referring to FIG. 15, based on the order of channels included in the first output information 1231 and the order of channels included in the first input information 1221, the attention map generator 820 may assign the same channel numbers (index) as those of the channels included in the first input information 1221 to the channels included in the first output information 1231. For example, when a channel number of a first channel included in the first input information 1221 is '0', the attention map generator 820 may assign the channel number '0' to a first channel included in the first output information 1231.

Also, the attention map generator 820 may assign channel numbers to the second and the third output information 1232 and 1233 in the same manner. For example, when a channel number of a first channel included in the second input information 1222 is '5', the attention map generator 820 may assign the channel number '5' to a first channel included in the second output information 1232.

A two-dimensional image 1510 of FIG. 15 may represent an image in which the channels included in the first to third output information 1231, 1232, and 1233 are arranged from left to right and from top to bottom in the order of channel numbers.

When the channel numbers are assigned to the first to third output information 1231, 1232, and 1233, the attention map generator 820 may generate the attention map 1250 by arranging the channels included in the first to third output information 1231, 1232, and 1233 in the order of channel numbers and integrating the first to third output information 1231, 1232, and 1233.

Figure 16:
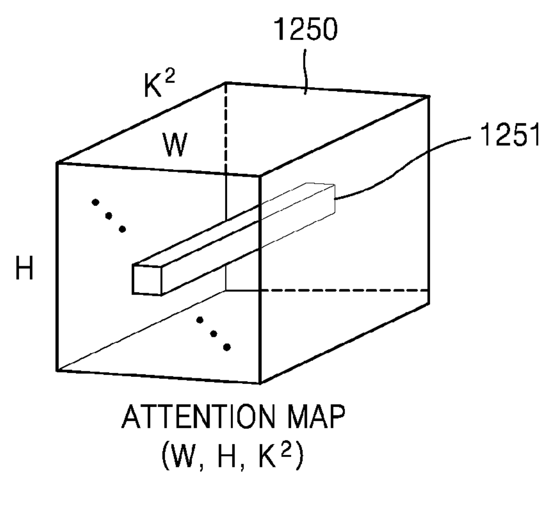
FIG. 16 is a reference diagram illustrating a method of generating a spatially variant kernel according to an embodiment of the disclosure.
Figure 16:
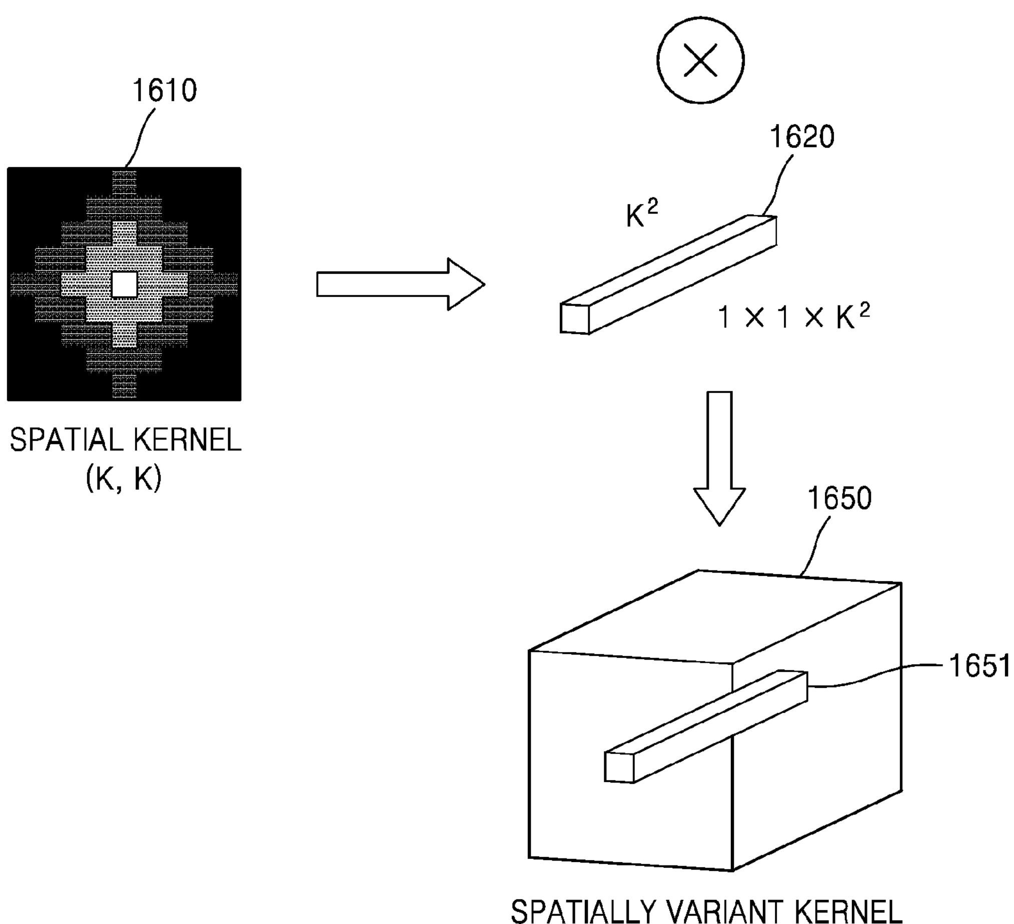

FIG. 16 is a reference diagram illustrating a method of generating a spatially variant kernel according to an embodiment of the disclosure.

Referring to FIG. 16, the spatially variant kernel generator 830 may generate a spatially variant kernel 1650 by using a spatial kernel 1610 and the attention map 1250. For example, the spatially variant kernel generator 830 may convert the spatial kernel 1610 into a one-dimensional vector 1620. The spatial kernel 1610 may have the size of K×K, and with respect to pixel values included in the spatial kernel 1610, a center pixel has a greatest value, and the pixel values may decrease away from the center pixel. The spatially variant kernel generator 830 may arrange the pixel values included in the spatial kernel 1610 in a channel direction and convert the spatial kernel 1610 into the weight vector 1620 having the size of $1\times1\times K^2$.

Meanwhile, the size of the attention map 1250 generated by the attention map generator 820 may be W×H, and the number of channels thereof may be $K^2$.

The spatially variant kernel generator 830 may generate the spatially variant kernel 1650 by multiplying the attention map 850 and the weight vector 1620. In this regard, the spatially variant kernel generator 830 may generate the spatially variant kernel 1650, by performing element-wise multiplication between each of one-dimensional vectors having the size of $1\times1\times K^2$ included in the attention map 1250 and the weight vector 1620 having the size of $1\times1\times K^2$.

As illustrated in FIG. 16, the spatially variant kernel generator 830 may generate a second vector 1651, by performing an element-wise multiplication operation between the weight vector 1620 and the first vector 1251 included in the attention map 1250. In this regard, the position of the first vector 1251 in the attention map 1250 and the position of the second vector 1651 in the spatially variant kernel 1650 may correspond to each other.

Similarly to the attention map 1250, the size of the spatially variant kernel 1650 may be W×H, and the number of channels thereof may be $K^2$.

Referring back to FIG. 8, the spatially variant kernel generator 830 may output the generated spatially variant kernel 1650 to the filter 840, and the filter 840 may generate the second image 102, by receiving the first image 101 and applying the spatially variant kernel 1650 to the first image 101. A method of generating the second image 102 by applying the spatially variant kernel 1650 to the first image 101 is described in detail with reference to FIG. 17.

Figure 17:
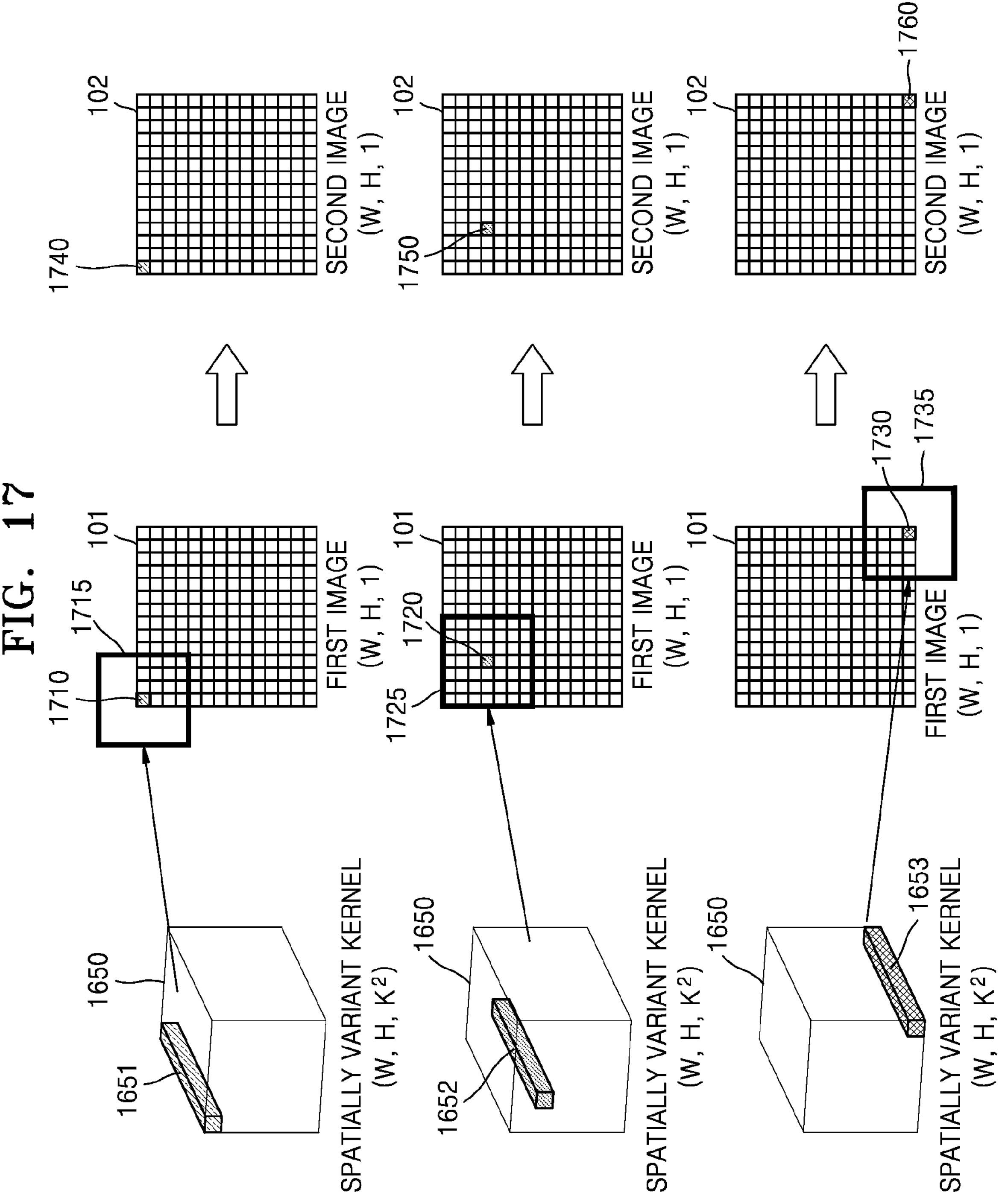
FIG. 17 is a reference diagram illustrating a method of applying a spatially variant kernel to a first image according to an embodiment of the disclosure.

FIG. 17 is a reference diagram illustrating a method of applying a spatially variant kernel to a first image according to an embodiment of the disclosure.

Referring to FIG. 17, the spatially variant kernel 1650 according to an embodiment of the disclosure may include a kernel vector corresponding to each of a plurality of pixels included in the first image 101. For example, the spatially variant kernel 1650 may include the first kernel vector 1651 corresponding to a first pixel 1710 included in the first image 101 and may include the second kernel vector 1652 corresponding to a second pixel 1720 included in the first image 101. Also, the spatially variant kernel 1650 may include a third kernel vector 1653 corresponding to a third pixel 1730 included in the first image 101.

The filter 840 may convert a one-dimensional kernel vector having the size of $1\times1\times K^2$ into a two-dimensional kernel having the size of K×K. For example, the filter 840 may convert the first kernel vector 1651 into a first kernel 1715, the second kernel vector 1652 into a second kernel 1725, and the third kernel vector 1653 into a third kernel 1735.

The filter 840 may calculate a value of a fourth pixel 1740 of the second image 102, by performing filtering by applying the first kernel 1715 to a first region with respect to the first pixel 1710 included in the first image 101. Also, the filter 840 may calculate a value of a fifth pixel 1750 of the second image 102, by performing filtering by applying the second kernel 1725 to a second region with respect to the second pixel 1720 included in the first image 101. Also, the filter 840 may calculate a value of a sixth pixel 1760 of the second image 102, by performing filtering by applying the third kernel 1735 to a third region with respect to the third pixel 1730 included in the first image 101.

In the same manner, the filter 840 may calculate the pixel values included in the second image 102, by performing filtering by applying a kernel corresponding to each of the pixels included in the first image 101 to a region with respect to each of the pixels included in the first image 101.

Figure 18:
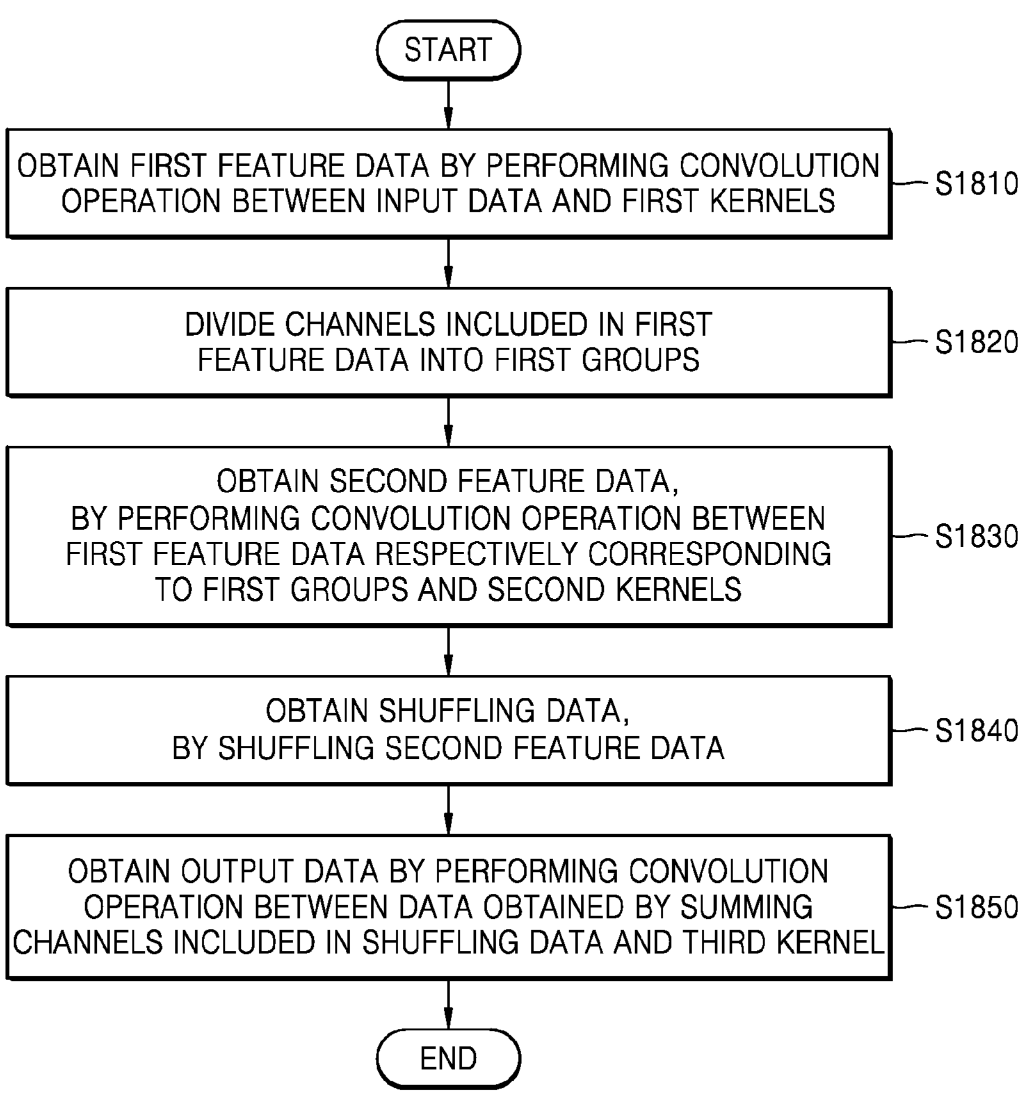
FIG. 18 is a flowchart illustrating an operating method of an image processing apparatus according to an embodiment of the disclosure.

FIG. 18 is a flowchart illustrating an operating method of an image processing apparatus according to an embodiment of the disclosure.

The image processing apparatus 100 according to an embodiment of the disclosure may generate output data, by processing input data, by using a convolutional neural network including a plurality of layers.

Operations S1810 to S1850 of FIG. 18 represent operations performed by a convolutional neural network.

Referring to FIG. 18, the image processing apparatus 100 according to an embodiment of the disclosure may obtain first feature data by performing a convolution operation between input data and first kernels (S1810). In this regard, the first feature data may include a plurality of channels.

The image processing apparatus 100 may divide the channels included in the first feature data into first groups (S1820).

For example, the image processing apparatus 100 may divide the plurality of channels included in the first feature data into ⅓ and input each of three groups to a convolution layer.

The image processing apparatus 100 may obtain second feature data, by performing a convolution operation between first feature data respectively corresponding to the first groups and second kernels (S1830).

The image processing apparatus 100 may obtain shuffling data, by shuffling the second feature data (S1840). The image processing apparatus 100 may share information included in the second feature data by performing shuffling, thereby improving the performance of image processing.

The image processing apparatus 100 may obtain output data by performing a convolution operation between data obtained by summing channels included in the shuffling data and a third kernel (S1850).

For example, the image processing apparatus 100 may obtain concatenation data by concatenating the shuffling data in a channel direction. The concatenation data may be input to the convolution layer, and the image processing apparatus 100 may obtain third feature data, by performing a convolution operation between the concatenation data and the third kernel included in the convolution layer. The image processing apparatus 100 may obtain output data, by applying an activation function to the third feature data.

Figure 19:
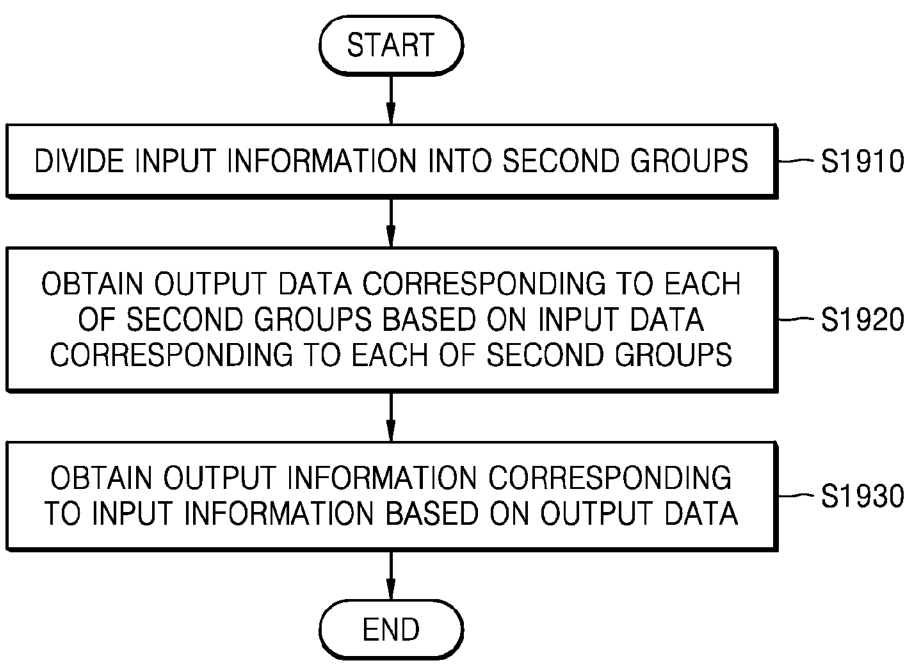
FIG. 19 is a flowchart illustrating an operating method of an image processing apparatus according to an embodiment of the disclosure.

FIG. 19 is a flowchart illustrating an operating method of an image processing apparatus according to an embodiment of the disclosure.

The image processing apparatus 100 according to an embodiment of the disclosure may generate output information, by processing input information, by using a convolutional neural network including a plurality of layers.

Referring to FIG. 19, the image processing apparatus 100 according to an embodiment of the disclosure may divide the input information into second groups (S1910).

For example, the image processing apparatus 100 may divide a plurality of channels included in the input information by ⅓ and obtain three groups (e.g., first input data, second input data, and third input data), but the disclosure is not limited thereto.

The image processing apparatus 100 may obtain output data corresponding to each of the second groups based on input data corresponding to each of the second groups (S1920).

For example, the image processing apparatus 100 may obtain first output data corresponding to the first input data, second output data corresponding to the second input data, and third output data corresponding to the third input data, by performing operations 1810 (S1810) to 1850 (S1850) of FIG. 18 on the first input data, the second input data, and the third input data, respectively.

The image processing apparatus 100 may obtain output information corresponding to input information based on output data (S1930).

For example, the image processing apparatus 100 may obtain output information, by concatenating the first to third output data in a channel direction.

Figure 20:
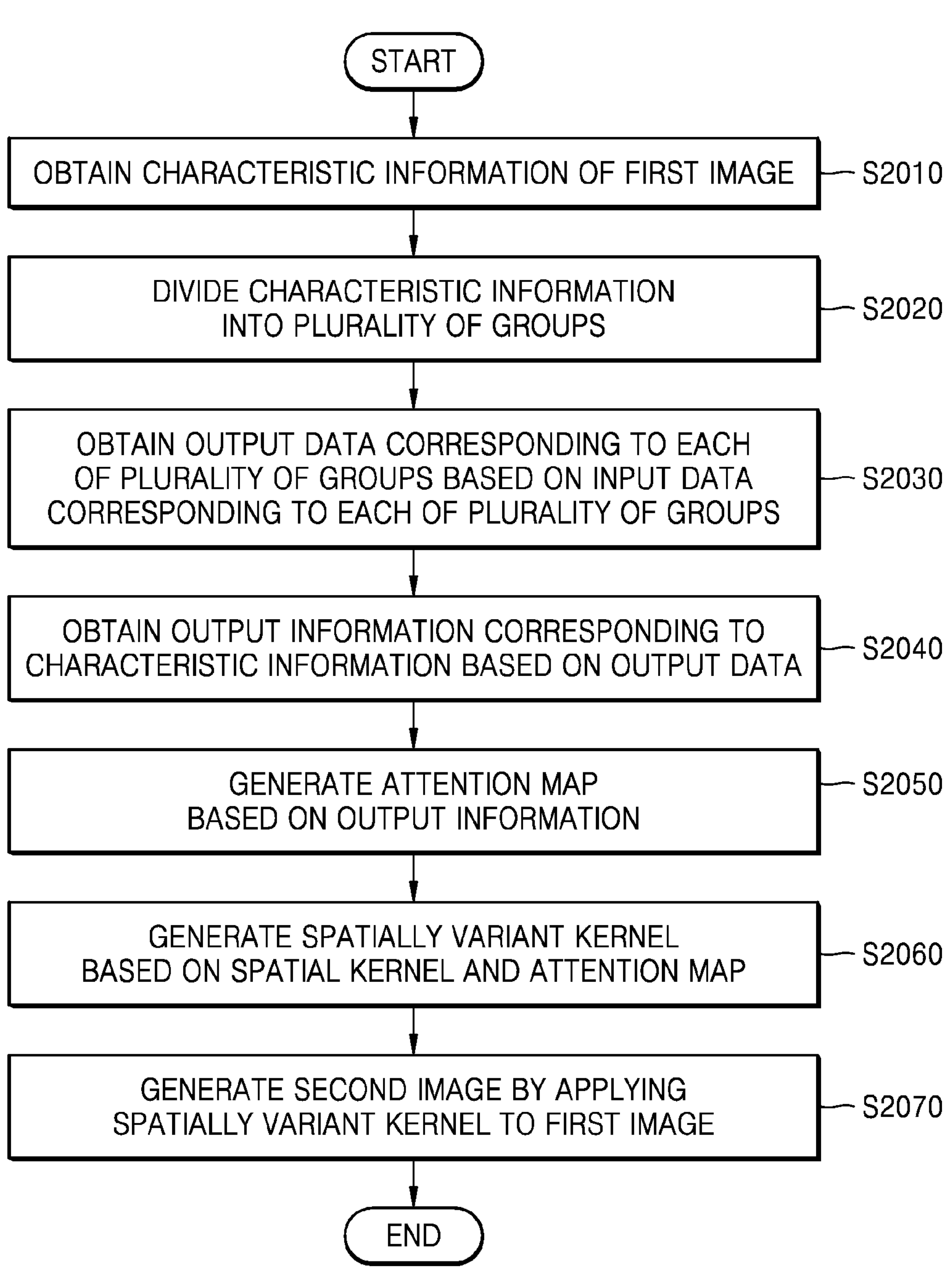
FIG. 20 is a flowchart illustrating an operating method of an image processing apparatus according to an embodiment of the disclosure.

FIG. 20 is a flowchart illustrating an operating method of an image processing apparatus according to an embodiment of the disclosure Referring to FIG. 20, the image processing apparatus 100 according to an embodiment of the disclosure may obtain characteristic information of a first image (S2010).

For example, the characteristic information of the first image may include similarity information, frequency characteristic information, gradient characteristic information, region characteristic information, etc. The similarity information may be information representing the similarity between each of a plurality of pixels included in the first image and a neighboring pixel. A method of generating the similarity information has been described in detail with reference to FIGS. 9, 10A, and 10B, and thus, redundant descriptions thereof are omitted.

Also, the image processing apparatus 100 may obtain the frequency characteristic information, by performing filtering using a Gaussian kernel or discrete cosine transform or wavelet transform, etc. on the first image. This has been described in detail with reference to FIG. 11, and thus, redundant descriptions thereof are omitted.

The image processing apparatus 100 according to an embodiment of the disclosure may divide the characteristic information into a plurality of groups (S2020).

For example, when the characteristic information includes a plurality of channels, the image processing apparatus 100 may divide the characteristic information into a plurality of groups according to a channel-wise feature value. When the characteristic information is similarity information, the channels may be divided into a plurality of groups according to the strength of each of the channels included in the similarity information. This has been described in detail with reference to FIG. 13, and thus, redundant descriptions thereof are omitted.

The image processing apparatus 100 according to an embodiment of the disclosure may obtain output data corresponding to each of the plurality of groups, based on input data corresponding to each of the plurality of groups (S2030).

For example, the image processing apparatus 100 may divide the characteristic information into three groups. The image processing apparatus 100 may obtain first output data corresponding to first input data, second output data corresponding to second input data, and third output data corresponding to third input data, by performing operations S1810 to S1850 on the first input data corresponding to a first group, the second input data corresponding to a second group, and the third input data corresponding to a third group, respectively.

The image processing apparatus 100 according to an embodiment of the disclosure may obtain output information corresponding to the characteristic information based on output data (S2040).

For example, the image processing apparatus 100 may obtain output information, by concatenating the first to third output data in a channel direction.

The image processing apparatus 100 according to an embodiment of the disclosure may generate an attention map based on the output information (S2050).

A method of generating the attention map based on the output information has been described in detail with reference to FIGS. 14 and 15, and thus, redundant descriptions thereof are omitted.

For example, referring to FIG. 14, the image processing apparatus 100 according to an embodiment of the disclosure may obtain the first to third output information 1231, 1232, and 1233, based on the output information corresponding to the characteristic information Also, referring to FIG. 15, the image processing apparatus 100 according to an embodiment of the disclosure may generate the attention map 1250 based on the first to third output information 1231, 1232, and 1233.

According to an embodiment of the disclosure, the image processing apparatus 100 may generate a spatially variant kernel based on the spatial kernel and the attention map (S1550).

For example, the image processing apparatus 100 may convert the spatial kernel into a one-dimensional vector. The spatial kernel may have a size of K×K, and as for the pixel values included in the spatial kernel, a center pixel has a greatest value, and the pixel values may decrease away from the center pixel. The image processing apparatus 100 may arrange the pixel values included in the spatial kernel in a channel direction and convert the spatial kernel into a weight vector having the size of $1\times1\times K^2$.

The size of the attention map generated in operation S2050 may be W×H, and the number of channels thereof may be $K^2$.

The image processing apparatus 100 may generate a spatially variant kernel by multiplying the attention map and the weight vector (S2060). In this regard, the image processing apparatus 100 may generate the spatially variant kernel by performing element-wise multiplication between each of the one-dimensional vectors having the size of $1\times1\times K^2$ included in the attention map and the weight vector having the size of $1\times1\times K^2$.

A method of generating the spatially variant kernel has already been described in detail with reference to FIG. 16, and thus, redundant descriptions thereof are omitted.

The image processing apparatus 100 according to an embodiment of the disclosure may generate a second image by applying the spatially variant kernel to the first image (S2070).

The spatially variant kernel generated in operation S2060 may include a kernel vector corresponding to each of the pixels included in the first image. For example, the spatially variant kernel may include a first kernel vector corresponding to a first pixel included in the first image and may include a second kernel vector corresponding to a second pixel included in the first image.

The image processing apparatus 100 may convert a one-dimensional kernel vector having the size of $1\times1\times K^2$ into a two-dimensional kernel having the size of K×K. For example, The image processing apparatus 100 may convert the first kernel vector into a two-dimensional first kernel, and the second kernel vector into a two-dimensional second kernel.

The image processing apparatus 100 may calculate a third pixel value included in the second image by performing filtering by applying the first kernel to a region with respect to the first pixel, and may calculate a fourth pixel value included in the second image by performing filtering by applying the second kernel to a region with respect to the second pixel.

Accordingly, when filtering the first image, the image processing apparatus 100 may perform filtering by applying different kernels according to the position of the center pixel.

Figure 21:
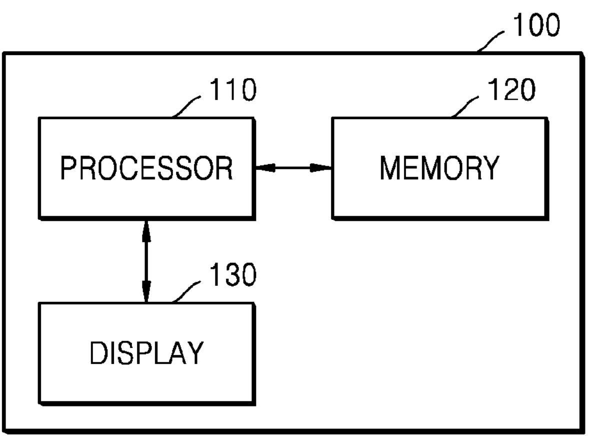
FIG. 21 is a block diagram illustrating a configuration of an image processing apparatus according to an embodiment of the disclosure.

FIG. 21 is a block diagram illustrating a configuration of an image processing apparatus according to an embodiment of the disclosure.

The image processing apparatus 100 of FIG. 21 may be an apparatus that performs image processing using the image processing network 103. The image processing network 103 according to an embodiment of the disclosure may include one or more convolutional neural networks. For example, the image processing network 103 may include at least one of the second convolutional neural network 620 of FIG. 6, the second convolutional neural network 720 of FIG. 7, or the convolutional neural network 1210 of FIG. 14. However, the disclosure is not limited thereto.

Referring to FIG. 21, the image processing apparatus 100 according to an embodiment of the disclosure may include a processor 110, a memory 120, and a display 130.

The processor 110 according to an embodiment of the disclosure may generally control the image processing apparatus 100. The processor 110 according to an embodiment of the disclosure may execute one or more programs stored in the memory 120.

According to an embodiment of the disclosure, the memory 120 may store various data, programs, or applications for driving and controlling the image processing apparatus 100. The programs stored in the memory 120 may include one or more instructions. The application or programs (one or more instructions) stored in the memory 120 may be executed by the processor 110.

The processor 110 according to an embodiment of the disclosure may include at least one of a central processing unit (CPU), a graphic processing unit (GPU), or a video processing unit (VPU). Alternatively, according to an embodiment of the disclosure, the processor 110 may be implemented in the form of a system-on-chip (SoC) in which at least one of a CPU, a GPU, or a VPU is integrated. Alternatively, the processor 110 may further include a neural processing unit (NPU).

The processor 110 according to an embodiment of the disclosure may generate a second image, by processing a first image, using one or more convolutional neural networks. For example, the processor 110 may generate the second image by performing denoising that processes a detailed edge and maintains texture while removing noise of the first image, by using the image processing network 103.

The processor 110 according to an embodiment of the disclosure may generate output data by processing input data using the second convolutional neural network 620 of FIG. 6. The structure and the operation of the second convolutional neural network 620 of FIG. 6 have been described in detail with reference to FIG. 6, and thus a detailed description thereof is omitted.

The processor 110 according to an embodiment of the disclosure may generate output information by processing input information using the second convolutional neural network 720 of FIG. 7. The structure and the operation of the second convolutional neural network 720 of FIG. 7 have been described in detail with reference to FIG. 7, and thus a detailed description thereof is omitted.

For example, the processor 110 may perform at least one of operations of the characteristic information generator 810, the attention map generator 820, the spatially variant kernel generator 830, or the filter 840 illustrated in and described with reference to FIGS. 8 to 17.

The processor 110 may obtain characteristic information of a first image. For example, the characteristic information of the first image may include similarity information, frequency characteristic information, gradient characteristic information, region characteristic information, etc. A method of generating the similarity information has been described in detail with reference to FIGS. 8, 10A, and 10B, and a method of obtaining the frequency characteristic information has been described in detail with reference to FIG. 1, and thus redundant descriptions thereof are omitted.

The processor 110 may divide the characteristic information into a plurality of groups. For example, when the characteristic information includes a plurality of channels, the processor 110 may divide the characteristic information into the plurality of groups according to a channel-wise feature value. When the characteristic information is similarity information, the processor 110 may divide the channels into a plurality of groups according to the strength of each of the channels included in the similarity information. This has been described in detail with reference to FIG. 13, and thus, redundant descriptions thereof are omitted.

The processor 110 may obtain a plurality of pieces of output information corresponding to the plurality of groups by using the convolutional neural network 1210 illustrated in and described with reference to FIG. 14. The structure and the operation of the convolutional neural network 1210 of FIG. 14 have been described in detail with reference to FIG. 14, and thus, redundant descriptions thereof are omitted.

The processor 110 may generate an attention map based on the plurality of pieces of output information. For example, the processor 110 may determine the order of channels of the output information based on the order of channels of the input information. The processor 110 may generate the attention map by integrating the plurality of pieces of output information in a channel direction according to the order of the channels. This has been described in detail with reference to FIG. 15, and thus, redundant descriptions thereof are omitted.

Also, the processor 110 may generate a spatially variant kernel based on the spatial kernel and the attention map. For example, the processor 110 may convert the spatial kernel into a one-dimensional vector. The spatial kernel may have the size of K×K, and with respect to pixel values included in the spatial kernel, a center pixel has a greatest value, and the pixel values may decrease away from the center pixel. The processor 110 may arrange the pixel values included in the spatial kernel in the channel direction and convert the spatial kernel into a weight vector having the size of $1\times1\times K^2$. The size of the attention map according to an embodiment of the disclosure may be W×H, the number of channels thereof may be $K^2$, and the processor 110 may generate the spatially variant kernel by multiplying the attention map and the weight vector. In this regard, the processor 110 may generate the spatially variant kernel by performing element-wise multiplication between each of the one-dimensional vectors having the size of $1\times1\times K^2$ included in the attention map and the weight vector having the size of $1\times1\times K^2$.

The processor 110 may generate a second image by applying the spatially variant kernel to the first image. The spatially variant kernel may include a kernel vector corresponding to each of the pixels included in the first image. For example, the spatially variant kernel may include a first kernel vector corresponding to a first pixel included in the first image and may include a second kernel vector corresponding to a second pixel included in the first image.

The processor 110 may convert a one-dimensional kernel vector having the size of $1\times1\times K^2$ into a two-dimensional kernel having the size of K×K. For example, the processor 110 may convert the first kernel vector into a two-dimensional first kernel, and the second kernel vector into a two-dimensional second kernel. The processor 110 may calculate a third pixel value included in the second image by performing filtering by applying the first kernel to a region with respect to the first pixel and may calculate a fourth pixel value included in the second image by performing filtering by applying the second kernel to a region with respect to the second pixel.

Moreover, the image processing network 103 according to an embodiment of the disclosure may be a network trained by a server or an external device. The external device may train the image processing network 103 based on training data. In this regard, the training data may include a plurality of data sets including image data including noise and image data in which an edge feature or a texture feature is preserved while noise is reshifted.

The server or the external device may determine parameter values included in the kernels used in each of a plurality of convolution layers included in the image processing network 103. For example, the server or the external device may determine the parameter values in the direction of minimizing a difference (loss information) in the image data (training data) in which the edge feature is preserved while the image data generated by the image processing network 103 and noise are reshifted.

The image processing apparatus 100 according to an embodiment of the disclosure may receive the completely trained image processing network 103 from the server or the external device and store the same in the memory 120. For example, the memory 120 may store the structure and parameter values of the image processing network 103 according to an embodiment of the disclosure, and the processor 110 may use the parameter values stored in the memory 120 to generate the second image in which the edge feature is preserved while the noise is reshifted from the first image according to an embodiment of the disclosure.

The display 130 according to an embodiment of the disclosure generates a driving signal by converting an image signal, a data signal, an on-screen display (OSD) signal, a control signal, etc. processed by the processor 110. The display 130 may be implemented as a plasma display panel (PDP), a liquid crystal display (LCD), an organic light-emitting diode (OLED) display, a flexible display, or a three-dimensional (3D) display. Furthermore, the display 130 may be formed as a touch screen to serve as an input device as well as an output device.

The display 130 according to an embodiment of the disclosure may display the second image obtained by performing image processing using the image processing network 103.

Meanwhile, the block diagram of the image processing apparatus 100 illustrated in FIG. 21 may be a block diagram for an embodiment of the disclosure. Each component of the block diagram may be integrated, added, or omitted according to the specifications of the image processing apparatus 100 that are actually implemented. That is, when necessary, two or more components may be combined into one component, or one component may be divided into two or more components. Also, functions performed by the respective blocks are for describing embodiment of the disclosure, and particular operations or devices thereof do not limit the scope of the disclosure.

An image processing apparatus according to an embodiment of the disclosure may process an image, by using one or more convolutional neural networks.

The image processing apparatus according to an embodiment of the disclosure may include a memory storing one or more instructions and at least one processor configured to execute the one or more instructions.

The at least one processor may be configured to execute the one or more instructions to obtain first feature data by performing a convolution operation between input data obtained from a first image and a first kernel.

The at least one processor may be configured to execute the one or more instructions to divide a plurality of channels included in the first feature data into first groups.

The at least one processor may be configured to execute the one or more instructions to obtain second feature data by performing a convolution operation between the first feature data respectively corresponding to the first groups and second kernels respectively corresponding to the first groups.

The at least one processor may be configured to execute the one or more instructions to obtain shuffling data by shuffling the second feature data.

The at least one processor configured to execute the one or more instructions to obtain output data by performing a convolution operation between data obtained by summing channels included in the shuffling data and a third kernel.

The at least one processor may be configured to execute the one or more instructions to generate a second image based on the output data.

The number of channels included in the output data may be less than at least one of the number of the plurality of channels included in the first feature data or a number of a plurality of channels included in the second feature data.

When the number of channels of input data and the number of channels of output data are large (the number of sub-kernels included in a kernel and the number of channels included in one sub-kernel are large), the image processing apparatus 100 according to an embodiment of the disclosure may divide input data into a plurality of groups and perform a convolution operation on each of the groups, thereby significantly reducing the memory usage and the operation amount.

The image processing apparatus 100 according to an embodiment of the disclosure may perform a convolution operation by decomposing one kernel into a plurality of kernels (e.g., a first kernel, a second kernel, and a third kernel). Accordingly, the image processing apparatus 100 may significantly reduce the memory usage and the operation amount while maintaining the performance of image processing.

The image processing apparatus 100 according to an embodiment of the disclosure may share information included in second feature data by performing shuffling on the second feature data, thereby improving the performance of image processing.

Accordingly, the image processing apparatus 100 may significantly reduce the memory usage and the operation amount while maintaining the performance of image processing The number of channels included in each of the second kernels may be determined based on the number of channels of the first feature data respectively corresponding to the first groups.

The at least one processor may be configured to execute the one or more instructions to perform an activation function operation on at least one of the first feature data, the second feature data, or the output data.

The at least one processor may be configured to execute the one or more instructions to divide a plurality of channels included in the input information obtained from the first image into second groups.

The at least one processor may be configured to execute the one or more instructions to obtain the output data respectively corresponding to the second groups, based on the input data respectively corresponding to the second groups.

The at least one processor may be configured to execute the one or more instructions to obtain output information corresponding to the input information, by summing channels included in the output data respectively corresponding to the second groups.

The at least one processor may be configured to execute the one or more instructions to obtain the input information representing characteristic information of the first image.

The characteristic information of the first image may include similarity information indicating a similarity between each of the pixels included in the first image and a neighboring pixel of each of the pixels.

The at least one processor may be configured to execute the one or more instructions to generate an attention map including weight information corresponding to each of the pixels included in the first image based on the output information.

The at least one processor may be configured to execute the one or more instructions to generate a spatially variable kernel corresponding to each of the pixels, based on a spatial kernel including weight information according to a position relationship between each of the pixels and the neighboring pixel and the attention map.

The at least one processor may be configured to execute the one or more instructions to generate the second image by applying the spatially variable kernel to the first image.

The at least one processor may be configured to execute the one or more instructions to obtain third feature data by performing a convolution operation between the output information and a fourth kernel.

The at least one processor may be configured to execute the one or more instructions to divide a plurality of channels included in the third feature data into the second groups.

The at least one processor may be configured to execute the one or more instructions to obtain fourth feature data by performing a convolution operation between the third feature data respectively corresponding to the second groups and fifth kernels respectively corresponding to the second groups.

The at least one processor may be configured to execute the one or more instructions to divide a plurality of channels included in the fourth feature data into the first groups.

The at least one processor may be configured to execute the one or more instructions to obtain second shuffling data by shuffling the fourth feature data respectively corresponding to the first groups.

The at least one processor may be configured to execute the one or more instructions to obtain fifth feature data by performing a convolution operation between the second shuffling data and sixth kernels respectively corresponding to the first groups.

The at least one processor may be configured to execute the one or more instructions to obtain sixth feature data respectively corresponding to the second groups by summing channels included in the fifth feature data.

The at least one processor may be configured to execute the one or more instructions to generate the attention map based on the sixth feature data.

In the spatial kernel, a pixel located in a center of the spatial kernel may have a greatest value, and a pixel value may decrease away from the center.

A size of the spatial kernel may be K×K, and the number of channels of the attention map may be $K^2$.

The at least one processor may be configured to execute the one or more instructions to convert pixel values included in the spatial kernel into a weight vector with a size of $1\times1\times K^2$ by arranging the pixel values in a channel direction.

The at least one processor may be configured to execute the one or more instructions to generate the spatially variable kernel by performing a multiplication operation between each of one-dimensional vectors with the size of $1\times1\times K^2$ included in the attention map and the weight vector.

The spatially variable kernel may include the same number of kernels as the number of pixels included in the first image.

The at least one processor may be configured to execute the one or more instructions to perform filtering by applying a first filter kernel included in the spatially variable kernel to a first region with respect to a first pixel included in the first image, and generate the second image by performing filtering, by applying a second filter kernel included in the spatially variable kernel to a second region with respect to a second pixel included in the first image.

An operating method of an image processing apparatus for processing an image, by using one or more convolutional neural networks, according to an embodiment of the disclosure may include obtaining first feature data by performing a convolution operation between input data obtained from a first image and a first kernel.

The operating method of an image processing apparatus for processing an image, by using one or more convolutional neural networks, according to an embodiment of the disclosure may include dividing a plurality of channels included in the first feature data into first groups.

The operating method of an image processing apparatus for processing an image, by using one or more convolutional neural networks, according to an embodiment of the disclosure may include obtaining second feature data by performing a convolution operation between the first feature data respectively corresponding to the first groups and second kernels respectively corresponding to the first groups.

The operating method of an image processing apparatus for processing an image, by using one or more convolutional neural networks, according to an embodiment of the disclosure may include obtaining shuffling data by shuffling the second feature data.

The operating method of an image processing apparatus for processing an image, by using one or more convolutional neural networks, according to an embodiment of the disclosure may include obtaining output data by performing a convolution operation between data obtained by summing channels included in the shuffling data and a third kernel.

The operating method of an image processing apparatus for processing an image, by using one or more convolutional neural networks, according to an embodiment of the disclosure may include generating a second image based on the output data.

The number of channels included in the output data may be less than at least one of the number of the plurality of channels included in the first feature data or a number of a plurality of channels included in the second feature data.

The number of channels included in each of the second kernels may be determined based on the number of channels of the first feature data respectively corresponding to the first groups.

The operating method of an image processing apparatus for processing an image, by using one or more convolutional neural networks, according to an embodiment of the disclosure may further include performing an activation function operation on at least one of the first feature data, the second feature data, or the output data.

The operating method of an image processing apparatus for processing an image, by using one or more convolutional neural networks, according to an embodiment of the disclosure may further include dividing a plurality of channels included in the input information obtained from the first image into second groups.

The operating method of an image processing apparatus for processing an image, by using one or more convolutional neural networks, according to an embodiment of the disclosure may further include obtaining output information corresponding to the input information, by using data respectively corresponding to the second groups as the input data, by summing channels included in the obtained output data The generating of the second image may include generating the second image based on the output information.

The operating method of an image processing apparatus for processing an image, by using one or more convolutional neural networks, according to an embodiment of the disclosure may further include obtaining the input information representing characteristic information of the first image.

The characteristic information of the first image may include similarity information indicating a similarity between each of the pixels included in the first image and a neighboring pixel of each of the pixels.

The generating of the second image based on the output information may include generating an attention map including weight information corresponding to each of the pixels included in the first image based on the output information.

The generating of the second image based on the output information may include generating a spatially variable kernel corresponding to each of the pixels, based on a spatial kernel including weight information according to a position relationship between each of the pixels and the neighboring pixel and the attention map.

The generating of the second image based on the output information may include generating the second image by applying the spatially variable kernel to the first image.

The generating of the attention map including the weight information corresponding to each of the pixels included in the first image based on the output information may include obtaining third feature data by performing a convolution operation between the output information and a fourth kernel.

The generating of the attention map including the weight information corresponding to each of the pixels included in the first image based on the output information may include dividing a plurality of channels included in the third feature data into the second groups.

The generating of the attention map including the weight information corresponding to each of the pixels included in the first image based on the output information may include obtaining fourth feature data by performing a convolution operation between the third feature data respectively corresponding to the second groups and fifth kernels respectively corresponding to the second groups.

The generating of the attention map including the weight information corresponding to each of the pixels included in the first image based on the output information may include obtaining second shuffling data by dividing a plurality of channels included in the fourth feature data into the first groups and shuffling the fourth feature data respectively corresponding to the first groups.

The generating of the attention map including the weight information corresponding to each of the pixels included in the first image based on the output information may include obtaining fifth feature data by performing a convolution operation between the second shuffling data and sixth kernels respectively corresponding to the first groups.

The generating of the attention map including the weight information corresponding to each of the pixels included in the first image based on the output information may include obtaining sixth feature data respectively corresponding to the second groups by summing channels included in the fifth feature data.

The generating of the attention map including the weight information corresponding to each of the pixels included in the first image based on the output information may include generating the attention map based on the sixth feature data.

In the spatial kernel, a pixel located in a center of the spatial kernel may have a greatest value, and a pixel value may decrease away from the center.

A size of the spatial kernel may be K×K, and the number of channels of the attention map may be $K^2$.

The generating of the spatially variable kernel may include converting pixel values included in the spatial kernel into a weight vector with a size of $1\times1\times K^2$ by arranging the pixel values in a channel direction.

The generating of the spatially variable kernel may include generating the spatially variable kernel by performing a multiplication operation between each of one-dimensional vectors with the size of $1\times1\times K^2$ included in the attention map and the weight vector.

The spatially variable kernel may include the same number of kernels as the number of pixels included in the first image.

The generating of the second image may include performing filtering by applying a first filter kernel included in the spatially variable kernel to a first region with respect to a first pixel included in the first image.

The generating of the second image may include performing filtering, by applying a second filter kernel included in the spatially variable kernel to a second region with respect to a second pixel included in the first image.

The operating method of the image processing apparatus according to an embodiment of the disclosure may be stored in a non-transitory computer-readable recording medium by being implemented in the form of program commands that may be performed by various computer means. The computer-readable recording medium may include program commands, data files, and data structures either alone or in combination. The program commands recorded on the computer-readable recording medium may be those that are especially designed and configured for the disclosure, or may be those that are known and available to computer programmers of ordinary skill in the art. Examples of the computer-readable recording medium may include magnetic media such as hard disks, floppy disks, and magnetic tapes, optical media such as CD-ROMs and DVDs, and magneto-optical media such as floptical disks, and hardware devices such as ROMs, RAMs, and flash memories particularly configured to store and execute program commands. Examples of the program commands may include not only machine language code generated by a compiler but also high-level language code that may be executed by a computer by using an interpreter, etc.

Also, the image processing apparatus and the operating method thereof according to the described embodiments of the disclosure may be included and provided in a computer program product. The computer program product may be traded as a product between a seller and a buyer.

The computer program product may include an S/W program and a computer-readable storage medium with a S/W program stored therein. For example, the computer program product may include products in the form of S/W programs (e.g., downloadable apps) electronically distributed through manufacturers of electronic devices or electronic markets (e.g., Google Play Store and App Store). For electronic distribution, at least a portion of the S/W program may be stored in a storage medium or may be temporarily generated. In this regard, the storage medium may be a storage medium of a server of a manufacturer, a server of an electronic market, or a relay server for temporarily storing the S/W program.

In a system including a server and a client device, the computer program product may include a storage medium of the server or a storage medium of the client device. Alternatively, when there is a third device (e.g., a smartphone) communicatively connected to the server or the client device, the computer program product may include a storage medium of the third device. Alternatively, the computer program product may include the S/W program itself that is transmitted from the server to the client device or the third device or transmitted from the third device to the client device.

In this regard, one of the server, the client device, and the third device may execute the computer program product to perform the method according to the described embodiments of the disclosure. Alternatively, two or more of the server, the client device, and the third device may execute the computer program product to perform the method according to the described embodiments of the disclosure in a distributed manner.

For example, the server (e.g., a cloud server or an artificial intelligence server) may execute the computer program product stored in the server, to control the client device communicatively connected to the server to perform the method according to the described embodiments of the disclosure.

Although embodiments of the disclosure have been described above in detail, the scope of the disclosure is not limited thereto and various modifications and improvements made by those of ordinary skill in the art by using the basic concept of the disclosure defined in the following claims are also included in the scope of the disclosure.

What is claimed is:

1. An image processing apparatus for processing an image by using one or more convolutional neural networks, the image processing apparatus comprising:

a memory storing one or more instructions; and at least one processor configured to execute the one or more instructions stored in the memory to:

divide a plurality of channels included in input information obtained from a first image into first groups;

obtain output data respectively corresponding to the first groups, based on input data respectively corresponding to the first groups by:

obtaining first feature data based on a first convolution operation being performed between input data and a first kernel;

dividing a plurality of channels included in the first feature data into second groups;

obtaining second feature data based on a second convolution operation being performed between the first feature data respectively corresponding to the second groups and second kernels respectively corresponding to the second groups;

obtaining shuffling data by shuffling the second feature data; and obtaining the output data by performing a convolution operation between data obtained by concatenating channels included in the shuffling data and a third kernel, obtain output information corresponding to the input information, by summing channels included in the output data respectively corresponding to the first groups;

obtain third feature data based on a third convolution operation being performed between the output information and a fourth kernel;

divide a plurality of channels included in the third feature data into the first groups;

obtain fourth feature data based on a fourth convolution operation being performed between the third feature data respectively corresponding to the first groups and fifth kernels respectively corresponding to the first groups;

divide a plurality of channels included in the fourth feature data into the second groups and obtain second shuffling data by shuffling the fourth feature data respectively corresponding to the second groups;

obtain fifth feature data based on a fifth convolution operation being performed between the second shuffling data and sixth kernels respectively corresponding to the second groups;

obtain sixth feature data respectively corresponding to the first groups by summing channels included in the fifth feature data;

generate an attention map including weight information corresponding to each of a plurality of pixels included in the first image, based on the sixth feature data;

generate a spatially variable kernel corresponding to each of the plurality of pixels, based on the attention map and a spatial kernel including weight information according to a position relationship between each of the plurality of pixels and at least one neighboring pixel of each of the plurality of pixels; and generate a second image by applying the spatially variable kernel to the first image.

2. The image processing apparatus of claim 1, wherein the at least one processor is further configured to execute the one or more instructions to:

determine a number of channels included in each of the second kernels based on the number of channels of the first feature data respectively corresponding to the first groups.

3. The image processing apparatus of claim 1, wherein, in the spatial kernel, a pixel located in a center of the spatial kernel has a greatest value, and a pixel value decreases away from the center.

4. The image processing apparatus of claim 1, wherein a size of the spatial kernel is K×K, and a number of channels of the attention map is $K^2$, the at least one processor is further configured to execute the one or more instructions stored in the memory to:

convert pixel values included in the spatial kernel into a weight vector with a size of $1\times1\times K^2$ by arranging the pixel values in a channel direction, and generate the spatially variable kernel based on a multiplication operation being performed between each of one-dimensional vectors with the size of $1\times1\times K^2$ included in the attention map and the weight vector, and wherein K denotes a natural number.

5. The image processing apparatus of claim 1, wherein the spatially variable kernel includes a same number of kernels as a number of pixels included in the first image.

6. An operating method of an image processing apparatus for processing an image by using one or more convolutional neural networks, the operating method comprising:

dividing a plurality of channels included in input information obtained from a first image into first groups;

obtaining output data respectively corresponding to the first groups, based on input data respectively corresponding to the first groups by:

obtaining first feature data based on a first convolution operation being performed between input data and a first kernel;

dividing a plurality of channels included in the first feature data into second groups;

obtaining second feature data based on a second convolution operation being performed between the first feature data respectively corresponding to the second groups and second kernels respectively corresponding to the second groups;

obtaining shuffling data by shuffling the second feature data; and obtaining the output data by performing a convolution operation between data obtained by concatenating channels included in the shuffling data and a third kernel;

obtaining output information corresponding to the input information, by summing channels included in the output data respectively corresponding to the first groups;

obtaining third feature data based on a third convolution operation being performed between the output information and a fourth kernel;

dividing a plurality of channels included in the third feature data into the first groups;

obtaining fourth feature data based on a fourth convolution operation being performed between the third feature data respectively corresponding to the first groups and fifth kernels respectively corresponding to the first groups;

dividing a plurality of channels included in the fourth feature data into the second groups and obtain second shuffling data by shuffling the fourth feature data respectively corresponding to the second groups;

obtaining fifth feature data based on a fifth convolution operation being performed between the second shuffling data and sixth kernels respectively corresponding to the second groups;

obtaining sixth feature data respectively corresponding to the first groups by summing channels included in the fifth feature data;

generating an attention map including weight information corresponding to each of a plurality of pixels included in the first image, based on the sixth feature data;

generating a spatially variable kernel corresponding to each of the plurality of pixels, based on the attention map and a spatial kernel including weight information according to a position relationship between each of the plurality of pixels and at least one neighboring pixel of each of the plurality of pixels; and generating a second image by applying the spatially variable kernel to the first image.

7. The operating method of claim 6, wherein a number of channels included in each of the second kernels is determined based on the number of channels of the first feature data respectively corresponding to the first groups.

8. The operating method of claim 6, wherein, in the spatial kernel, a pixel located in a center of the spatial kernel has a greatest value, and a pixel value decreases away from the center.

9. The operating method of claim 6, wherein a size of the spatial kernel is K×K, and a number of channels of the attention map is $K^2$, the generating of the spatially variable kernel comprises:

converting pixel values included in the spatial kernel into a weight vector with a size of $1\times1\times K^2$ by arranging the pixel values in a channel direction, and generating the spatially variable kernel based on a multiplication operation being performed between each of one-dimensional vectors with the size of $1\times1\times K^2$ included in the attention map and the weight vector, and wherein K denotes a natural number.

10. The operating method of claim 6, wherein the spatially variable kernel includes a same number of kernels as a number of pixels included in the first image.

11. A non-transitory computer-readable recording medium having recorded thereon a program for performing an image processing method, the image processing method comprising:

dividing a plurality of channels included in input information obtained from a first image into first groups;

obtaining output data respectively corresponding to the first groups, based on input data respectively corresponding to the first groups by:

obtaining first feature data based on a first convolution operation being performed between input data and a first kernel;

dividing a plurality of channels included in the first feature data into second groups;

obtaining second feature data based on a second convolution operation being performed between the first feature data respectively corresponding to the second groups and second kernels respectively corresponding to the second groups;

obtaining shuffling data by shuffling the second feature data; and obtaining the output data by performing a convolution operation between data obtained by concatenating channels included in the shuffling data and a third kernel;

obtaining output information corresponding to the input information, by summing channels included in the output data respectively corresponding to the first groups;

obtaining third feature data based on a third convolution operation being performed between the output information and a fourth kernel;

dividing a plurality of channels included in the third feature data into the first groups;

obtaining fourth feature data based on a fourth convolution operation being performed between the third feature data respectively corresponding to the first groups and fifth kernels respectively corresponding to the first groups;

dividing a plurality of channels included in the fourth feature data into the second groups and obtain second shuffling data by shuffling the fourth feature data respectively corresponding to the second groups;

obtaining fifth feature data based on a fifth convolution operation being performed between the second shuffling data and sixth kernels respectively corresponding to the second groups;

obtaining sixth feature data respectively corresponding to the first groups by summing channels included in the fifth feature data;

generating an attention map including weight information corresponding to each of a plurality of pixels included in the first image, based on the sixth feature data;

generating a spatially variable kernel corresponding to each of the plurality of pixels, based on the attention map and a spatial kernel including weight information according to a position relationship between each of the plurality of pixels and at least one neighboring pixel of each of the plurality of pixels; and generating a second image by applying the spatially variable kernel to the first image.

* * * * *